(12) United States Patent
Nishimura et al.

(10) Patent No.: US 9,176,264 B2
(45) Date of Patent: Nov. 3, 2015

(54) LIGHT-DIFFUSING ELEMENT, POLARIZING PLATE HAVING LIGHT-DIFFUSING ELEMENT ATTACHED THERETO, POLARIZING ELEMENT, AND LIQUID CRYSTAL DISPLAY DEVICE EQUIPPED WITH THOSE COMPONENTS

(75) Inventors: Akinori Nishimura, Ibaraki (JP); Kozo Nakamura, Ibaraki (JP); Hiroyuki Takemoto, Ibaraki (JP); Takehito Fuchida, Ibaraki (JP); Kazuto Yamagata, Ibaraki (JP); Shunsuke Shutou, Ibaraki (JP); Tomohito Takita, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 163 days.

(21) Appl. No.: 13/822,564

(22) PCT Filed: Sep. 16, 2011

(86) PCT No.: PCT/JP2011/071229
§ 371 (c)(1),
(2), (4) Date: May 31, 2013

(87) PCT Pub. No.: WO2012/036270
PCT Pub. Date: Mar. 22, 2012

(65) Prior Publication Data
US 2013/0265506 A1    Oct. 10, 2013

(30) Foreign Application Priority Data

Sep. 17, 2010  (JP) .................. 2010-210127
Sep. 21, 2010  (JP) .................. 2010-210333
Sep. 21, 2010  (JP) .................. 2010-210586

(51) Int. Cl.
*G02F 1/1335* (2006.01)
*G02B 5/02* (2006.01)
(Continued)

(52) U.S. Cl.
CPC ............ *G02B 5/0294* (2013.01); *G02B 5/0242* (2013.01); *G02B 5/0278* (2013.01); *G02F 1/133504* (2013.01); *G09F 13/0409* (2013.01); *G02F 1/13338* (2013.01)

(58) Field of Classification Search
CPC .................. G02F 1/133504; G02F 1/133502; G02B 5/0294
USPC .......................................... 349/112; 359/599
See application file for complete search history.

(56) References Cited

U.S. PATENT DOCUMENTS 6,771,336 B2  8/2004  Tatsuta et al.
7,271,862 B2  9/2007  Matsunaga et al.
(Continued)

FOREIGN PATENT DOCUMENTS

CN    1646948 A    7/2005
JP    6-347617 A   12/1994
(Continued)

OTHER PUBLICATIONS

Chinese Office Action dated Sep. 23, 2014, isued in corresponding Chinese Application No. 201180044551.2; w/ English Translation. (33 pages).
(Continued)

*Primary Examiner* — Nathanael R Briggs
(74) *Attorney, Agent, or Firm* — Westerman, Hattori, Daniels & Adrian, LLP

(57) ABSTRACT

There is provided a light diffusing element made of a thin film capable of realizing low back scattering and a high haze. A light diffusing element according to an embodiment of the invention includes: a first region having a first refractive index n1; a refractive index modulation region having a substantially spherical shell shape and surrounding the first region; and a second region having a second refractive index n2, the second region being positioned on a side of the refractive index modulation region opposite to the first region. The light diffusing element satisfies the following expressions (1) and (2):

$$0.0006 \le \Delta n/L \tag{1}$$

$$10 \le (\Delta n)^2 \times A \times B \le 100 \tag{2}$$

19 Claims, 20 Drawing Sheets

(51) Int. Cl.
    *G02B 13/20* (2006.01)
    *G09F 13/04* (2006.01)
    *G02F 1/1333* (2006.01)

(56) References Cited

U.S. PATENT DOCUMENTS

| | | | |
|---|---|---|---|
| 7,817,225 | B2 | 10/2010 | Yoshihide et al. |
| 7,997,743 | B2 | 8/2011 | Suzuki et al. |
| 8,405,794 | B2 | 3/2013 | Fuchida et al. |
| 2002/0135714 | A1 | 9/2002 | Tatsuta et al. |
| 2005/0128379 | A1 | 6/2005 | Matsunaga et al. |
| 2005/0207137 | A1 | 9/2005 | Nishikawa et al. |
| 2006/0227695 | A1 | 10/2006 | Nagaoka |
| 2006/0274272 | A1 | 12/2006 | Yoshihide et al. |
| 2009/0051278 | A1 | 2/2009 | Saneto et al. |
| 2009/0097123 | A1* | 4/2009 | LaFleur et al. ............ 359/599 |
| 2010/0039708 | A1* | 2/2010 | Suzuki et al. ............ 359/601 |
| 2011/0317099 | A1 | 12/2011 | Fuchida et al. |

FOREIGN PATENT DOCUMENTS

| | | |
|---|---|---|
| JP | 3-071538 B2 | 7/2000 |
| JP | 3071538 B2 | 7/2000 |
| JP | 2000-214446 A | 8/2000 |
| JP | 2001-201741 A | 7/2001 |
| JP | 2002-212245 A | 7/2002 |
| JP | 2002-214408 A | 7/2002 |
| JP | 2002-328207 A | 11/2002 |
| JP | 2003-262710 A | 9/2003 |
| JP | 2003-307728 A | 10/2003 |
| JP | 2004-038009 A | 2/2004 |
| JP | 2004-127243 A | 4/2004 |
| JP | 2005-004163 A | 1/2005 |
| JP | 2006-324107 A | 11/2006 |
| JP | 2009-070814 A | 4/2009 |
| JP | 2009-516902 A | 4/2009 |
| JP | 2009-244383 A | 10/2009 |
| JP | 2010-008475 A | 1/2010 |
| JP | 2010-20211 A | 1/2010 |
| JP | 2010-077243 A | 4/2010 |
| JP | 2010-107616 A | 5/2010 |
| KR | 10-2009-0019753 A | 2/2009 |
| KR | 10-2009-0039475 A | 4/2009 |
| TW | 200707012 A | 2/2007 |
| TW | 200730886 A | 8/2007 |
| TW | 201011356 A1 | 3/2010 |
| TW | 201038979 A1 | 11/2010 |
| WO | 2006/124588 A1 | 11/2006 |

OTHER PUBLICATIONS

International Search Report of PCT/JP2011/071229, mailing date of Nov. 15, 2011.
Office Action dated May 19, 2014, issued in Corresponding Korean Patent Application No. 10-2013-7006563, with English Translation (26 pages).
Office Action dated Dec. 29, 2014, issued in Korean Application No. 10-2013-7006563, w/English translation. (25 pages).
Office Action dated May 20, 2015, issued in corresponding Japanese Patent Application No. 2011-202284, with English translation (11 pages).
Office Action dated Aug. 27, 2015, issued in counterpart Korean patent application No. 2013-7006563 (w/English Translation) (8 pages).

* cited by examiner

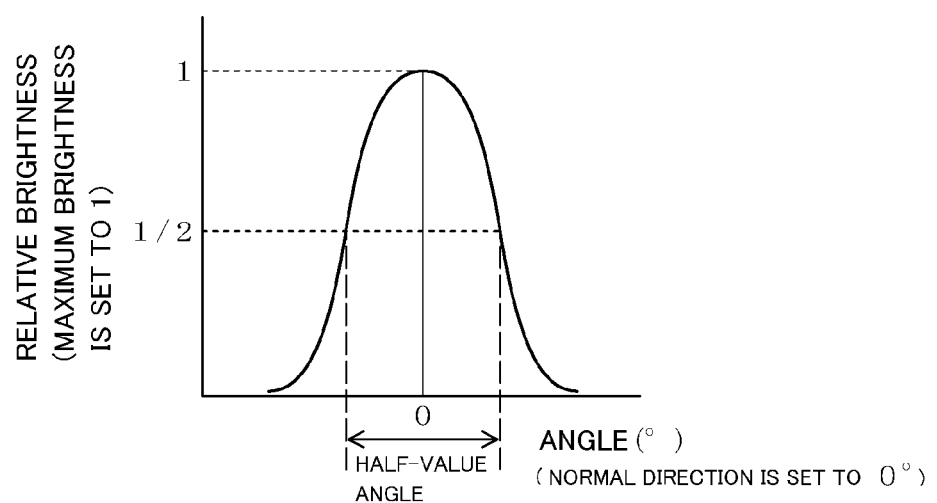

FIG. 18
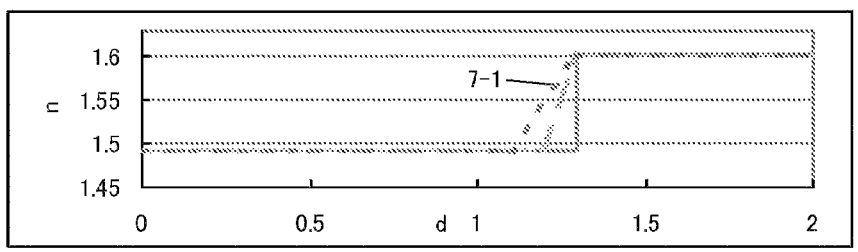
(a)
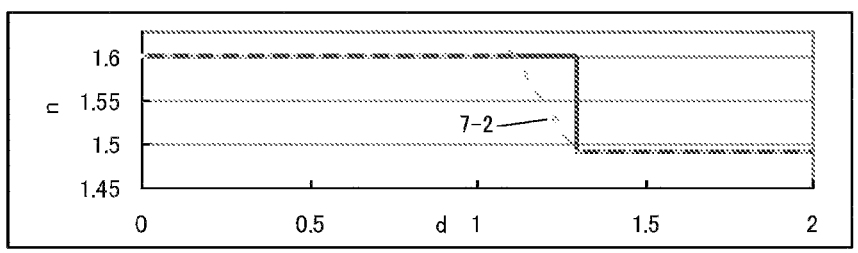
(b)
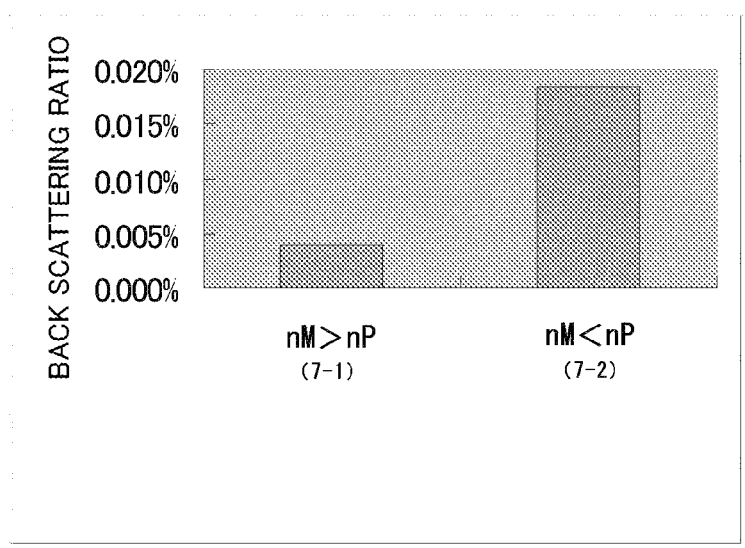
(c)

FIG. 19
(a)
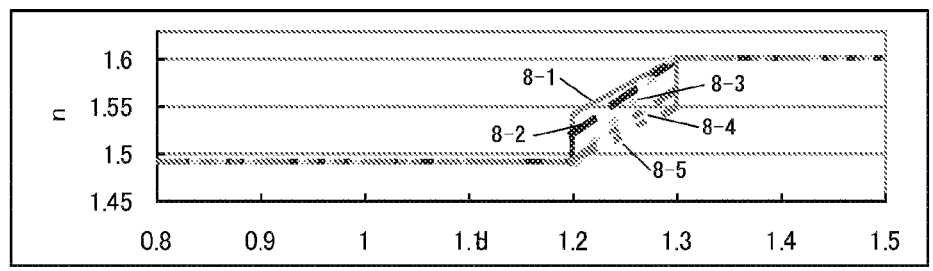
(b)
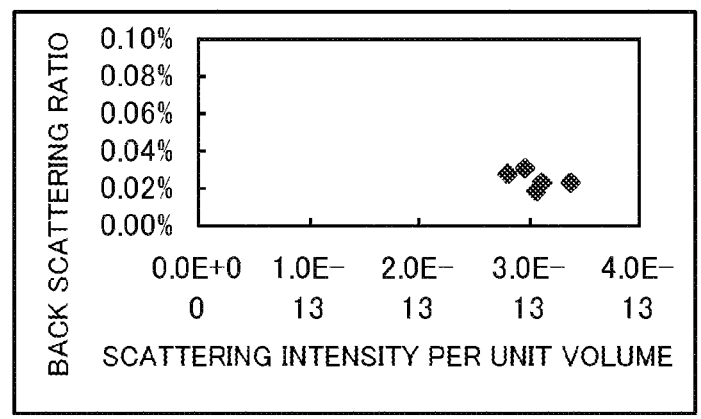

FIG. 20
(a)
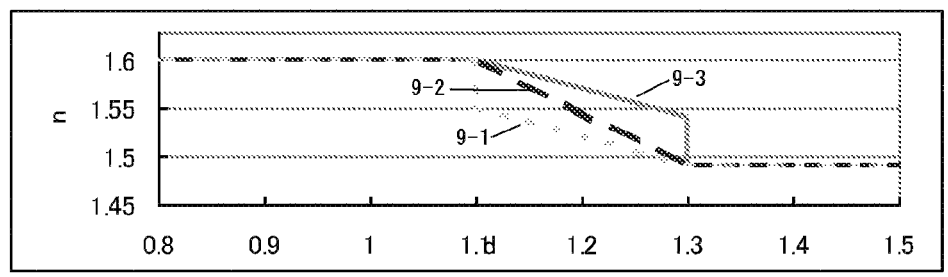
(b)
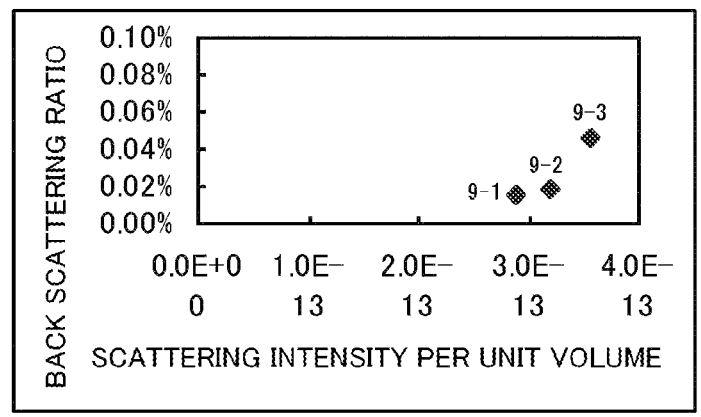

FIG. 21
(a)
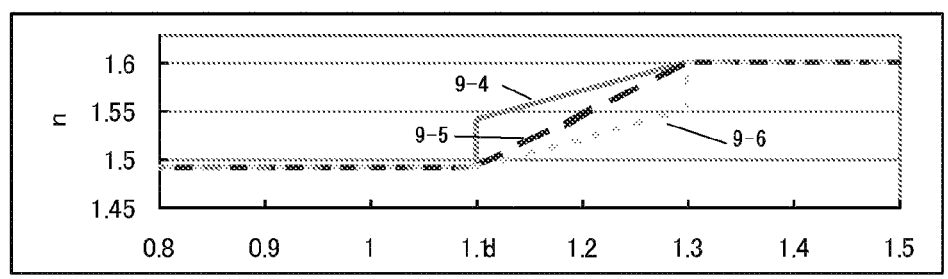
(b)
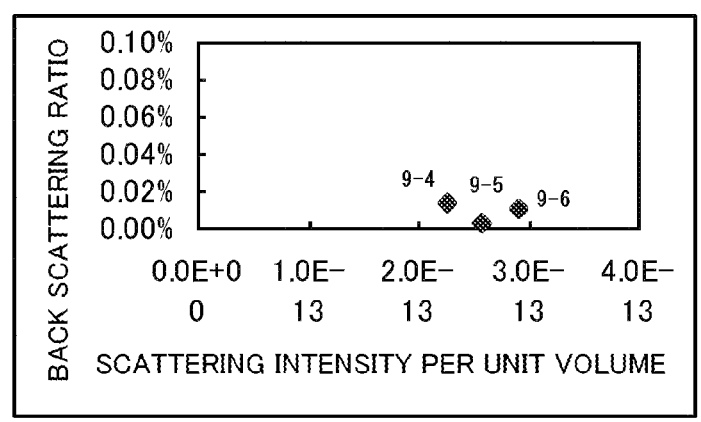

LIGHT-DIFFUSING ELEMENT, POLARIZING PLATE HAVING LIGHT-DIFFUSING ELEMENT ATTACHED THERETO, POLARIZING ELEMENT, AND LIQUID CRYSTAL DISPLAY DEVICE EQUIPPED WITH THOSE COMPONENTS

TECHNICAL FIELD

The present invention relates to a light diffusing element, a polarizing plate with a light diffusing element, a polarizing element, and a liquid crystal display device using these components.

BACKGROUND ART

A light diffusing element is widely used in illumination covers, screens for projection televisions, surface-emitting devices (for example, liquid crystal display devices), and the like. In recent years, the light diffusing element has been used for enhancing the display quality of liquid crystal display devices and the like and for improving viewing angle properties, for example. As the light diffusing element, for example, there is proposed a light diffusing element in which fine particles are dispersed in a matrix such as a resin sheet (see, for example, Patent Literature 1). In such light diffusing element, most of incident light scatters forward (output plane side), whereas apart thereof scatters backward (incident plane side). As a refractive index difference between each of the fine particles and the matrix becomes larger, diffusibility (for example, a haze value) increases. However, if the refractive index difference is large, backscattering increases. More specifically, there is proposed a technology for placing a light diffusing element on the top surface of a liquid crystal display device so as to enhance the display quality of the liquid crystal display device. However, such light diffusing element does not have sufficient light diffusibility (for example, a haze value of less than 90%), and does not exert any sufficient effect of improving the display quality. On the other hand, in the case where a light diffusing element having large light diffusibility (for example, a haze value of 90% or more) is used in a liquid crystal display device so as to enhance the display quality, when outside light is incident upon the liquid crystal device, a screen becomes whitish, resulting in a problem in that it is difficult to display a video and an image with a high contrast in a bright place. This is because the fine particles in the light diffusing element cause the incident light to scatter backward as well as forward. According to the conventional light diffusing element, as a haze value becomes larger, backscattering increases. Therefore, it is very difficult to satisfy both the increase in light diffusibility and the suppression of backscattering. Further, in an illumination application, as a haze value becomes larger, backscattering increases and a total light transmittance decreases, which degrades light use efficiency.

As means for solving the above-mentioned problems, based on the concept of suppressing the reflection at an interface between each of the fine particles and the matrix, for example, there are proposed: core-shell fine particles, in which the refractive index of a core is different from that of a shell, and fine particles having gradient refractive indices, such as the so-called gradient index (GRIN) fine particles, in which the refractive index changes continuously from the center of each of the fine particles toward the outer side, are dispersed in a resin (see, for example, Patent Literatures 2 to 8). However, with any one of those technologies, a thin light diffusing element with a high haze cannot be obtained. For example, in the GRIN fine particles of Patent Literature 8, when a thickness of a refractive index change portion is defined as L (nm) and a refractive index change amount of the refractive index change portion is defined as Δn, a steep refractive index change portion with a Δn/L of 0.00053 (nm$^{-1}$) is formed. However, a light diffusing film using the GRIN fine particles of Patent Literature 8 only gains a haze of 86.5% even when a film thickness thereof is set to as large as 20 μm. As described above, there is a strong demand for a thin light diffusing element with a high haze (having excellent light diffusibility).

Meanwhile, along with the expansion of applications of liquid crystal display devices in recent years, various new problems have arisen. For example, in mobile telephones, in order to impart durability and design property, a plastic substrate (in general, an acrylic plate) is placed on a liquid crystal display portion. Further, in in-car displays such as a car navigator, tablet PCs used often industrially, public displays, and multi-functional mobile telephones, a touch panel is placed on the surface of a display portion (see, for example, Patent Literature 9). Such front substrate (for example, a plastic substrate or a touch panel) and a polarizing plate are usually fixed with a double-sided tape attached to an edge portion of the polarizing plate. The thickness of the double-sided tape is generally about 120 μm, and hence, there is a problem in that the thickness of the entire liquid crystal display device increases. In the case of using such double-sided tape for the touch panel, in order to minimize impact, sponge of about 1,000 μm is also used together with the double-sided tape, and hence, the thickness further increases. Further, only edge portions are bonded to each other with the double-sided tape, and hence, an air layer is formed between the polarizing plate and the front substrate. The refractive index of air is about 1.0, whereas the refractive index of a member forming the front substrate such as a polymer or glass is about 1.4 to 1.7. Thus, the following problem arises: a refractive index difference between the air layer and the front substrate becomes large, and hence, visibility in a bright environment is degraded owing to interface reflection of external light. Further, in the liquid crystal display device, a color filter layer of a liquid crystal cell generally functions as a screen. In the case of using a touch panel as the front substrate, an input hitting point is on the surface of the front substrate. In this case, the following problem arises: there is a distance between the surface of the liquid crystal cell serving as a screen and the surface of the front substrate, and hence, parallax is caused.

In order to suppress reflection of external light and glittering of a display screen in a liquid crystal display device using a front substrate, there has been known a liquid crystal display device in which a front substrate and a polarizing plate or a display are attached to each other with a pressure-sensitive adhesive layer having a light diffusing function interposed therebetween (see, for example, Patent Literatures 10 and 11). However, the light diffusing pressure-sensitive adhesive layer needs to be thick in order to realize a high haze (impart light diffusibility), which makes it difficult to realize a reduction in thickness.

Further, in recent years, an attempt to suppress power consumption of the liquid crystal display device has been made. The liquid crystal display device is generally being developed for a panel portion and a backlight portion separately, and the attempt to suppress power consumption has been made mainly in the backlight portion. FIG. 23 illustrates a basic structure of a general direct type backlight unit. Light sources 551 are arranged at a predetermined interval in a lamp house 550 having a reflective film attached to an inner surfaced thereof. A diffusion plate 552 is placed above the lamp house 550 for the purposes of holding the shape of the lamp house, eliminating a lamp image, and the like. In general, it is difficult to eliminate a lamp image only with the diffusion plate 552, and hence, a few diffusing sheets (diffusing films) 570 are placed. Further, for the purpose of enhancing brightness, a brightness enhancing sheet 110 such as a reflection type polarizer is placed. Light emitted from a backlight source is finite, and hence, there is a demand for enhancement of use efficiency of the backlight source. In order to fulfill this demand, for example, there has been proposed a backlight unit using a reflection type polarized light separation element including a metal lattice arranged on a wire grid (see, for example, Patent Literature 12). However, there is a demand for further enhancement of the use efficiency.

CITATION LIST

Patent Literature

[PTL 1] JP 3071538 B2
[PTL 2] JP 06-347617 A
[PTL 3] JP 2003-262710 A
[PTL 4] JP 2002-212245 A
[PTL 5] JP 2002-214408 A
[PTL 6] JP 2002-328207 A
[PTL 7] JP 2010-077243 A
[PTL 8] JP 2010-107616 A
[PTL 9] JP 2001-201741 A
[PTL 10] JP 2004-127243 A
[PTL 11] JP 2010-008475 A
[PTL 12] JP 2006-324107 A
[PTL 13] JP 2009-516902 W

SUMMARY OF INVENTION

Technical Problem

The present invention has been achieved so as to solve the conventional problems, and an object of the present invention is to provide a light diffusing element made of a thin film capable of realizing low backscattering and a high haze. Another object of the present invention is to provide a light diffusing element capable of providing a liquid crystal display device including a front substrate, which is excellent in visibility in a bright environment and can achieve reductions in parallax and thickness. Still another object of the present invention is to provide a light diffusing element capable of providing a backlight side polarizing element which satisfactorily eliminates brightness unevenness of a lamp image or the like and contributes to enhancement of light use efficiency.

Solution to Problem

A light diffusing element according to an embodiment of the present invention includes: a first region having a first refractive index n1; a refractive index modulation region having a substantially spherical shell shape and surrounding the first region; and a second region having a second refractive index n2, the second region being positioned on a side of the refractive index modulation region opposite to the first region. The light diffusing element satisfies the following expressions (1) and (2):

$$0.0006 \leq \Delta n/L \quad (1)$$

$$10 \leq (\Delta n)^2 \times A \times B \leq 100 \quad (2)$$

where $\Delta n$ represents an absolute value $|n1-n2|$ of a difference between the first refractive index n1 and the second refractive index n2, L (nm) represents an average thickness of the refractive index modulation region, a unit of $\Delta n/L$ is $(nm^{-1})$, A represents a number of parts by weight of a material forming the first region with respect to 100 parts by weight of the entire light diffusing element, and B represents a number of parts by weight of a material forming the second region with respect to 100 parts by weight of the entire light diffusing element.

A light diffusing element according to another embodiment of the present invention includes: a matrix; and light diffusing fine particles dispersed in the matrix. In the light diffusing element, a refractive index modulation region having a refractive index which changes substantially continuously is formed in an external portion in a vicinity of a surface of each of the light diffusing fine particles. Further, the light diffusing element satisfies the following expressions (1) and (2):

$$0.0006 \leq \Delta n/L \quad (1)$$

$$10 \leq (\Delta n)^2 \times A \times B \leq 100 \quad (2)$$

where $\Delta n$ represents an absolute value $|n_M - n_P|$ of a difference between an average refractive index $n_M$ of the matrix and a refractive index $n_P$ of each of the light diffusing fine particles, L (nm) represents an average thickness of the refractive index modulation region, a unit of $\Delta n/L$ is $(nm^{-1})$, A represents a number of parts by weight of the light diffusing fine particles with respect to 100 parts by weight of the entire light diffusing element, and B represents a number of parts by weight of the matrix with respect to 100 parts by weight of the entire light diffusing element.

In one embodiment of the present invention, the light diffusing element satisfies a relationship of $n_M > n_P$.

In one embodiment of the present invention, the light diffusing element satisfies the following expression (3):

$$0.005 \leq L/r_P \leq 0.40 \quad (3)$$

where $r_P$ represents a radius (nm) of each of the light diffusing fine particles.

In one embodiment of the present invention, the matrix includes a resin component and an ultrafine particle component, and the refractive index modulation region is formed by a substantial gradient of a dispersion concentration of the ultrafine particle component in the matrix.

In one embodiment of the present invention, the light diffusing element satisfies the following expression (4):

$$|n_P - n_A| < |n_P - n_B| \quad (4)$$

where $n_A$ represents a refractive index of the resin component of the matrix, and $n_B$ represents a refractive index of the ultrafine particle component of the matrix.

In one embodiment of the present invention, the light diffusing element has a haze of 90% to 99.9%.

In one embodiment of the present invention, the light diffusing element has a thickness of 4 μm to 50 μm.

In one embodiment of the present invention, the light diffusing element has a light diffusion half-value angle of 10° to 150°.

According to another aspect of the present invention, a polarizing plate with a light diffusing element is provided. The polarizing plate with a light diffusing element includes: the above-mentioned light diffusing element; and a polarizer.

In one embodiment of the present invention, the polarizing plate with a light diffusing element is used in a liquid crystal display device including a liquid crystal cell, a front substrate, and a collimated light source device, wherein the polarizing plate with a light diffusing element is placed so that the light diffusing element and the front substrate are opposed to each other when used in the liquid crystal display device.

According to still another aspect of the present invention, a polarizing element to be placed on a backlight side of a liquid crystal cell of a liquid crystal display device, is provided. The polarizing element includes: the above-mentioned light diffusing element; and a reflection type polarizer.

In one embodiment of the present invention, the light diffusing element is formed directly on the reflection type polarizer.

In one embodiment of the present invention, the polarizing element further includes an absorption type polarizer.

According to still another aspect of the present invention, a liquid crystal display device is provided. The liquid crystal display device includes: a liquid crystal cell; a collimated light source device, which is configured to emit collimated light to the liquid crystal cell; and the above-mentioned light diffusing element, which is configured to transmit and diffuse the collimated light passing through the liquid crystal cell.

A liquid crystal display device according to another embodiment of the present invention includes: a liquid crystal cell; a collimated light source device, which is configured to emit collimated light to the liquid crystal cell; the above-mentioned light diffusing element, which is configured to transmit and diffuse the collimated light passing through the liquid crystal cell; and a front substrate placed further on a viewer side of the light diffusing element.

In one embodiment of the present invention, the front substrate is a transparent protective plate or a touch panel.

A liquid crystal display device according to still another embodiment of the present invention includes: a liquid crystal cell; polarizing plates placed on both sides of the liquid crystal cell; a touch panel placed so as to be opposed to the polarizing plate on a further viewer side of the polarizing plate placed on a viewer side; the above-mentioned light diffusing element placed between a glass plate of the touch panel and a conductive thin film of the touch panel; and a collimated light source device placed on an outer side of the polarizing plate placed opposite to the viewer side, for emitting collimated light.

A liquid crystal display device according to still another embodiment of the present invention includes: a liquid crystal cell; a backlight portion; and the above-mentioned polarizing element placed between the liquid crystal cell and the backlight portion.

Advantageous Effects of Invention

According to the present invention, the light diffusing element made of a thin film capable of realizing low backscattering and a high haze can be obtained by: forming the first region having the first refractive index n1, the refractive index modulation region having a substantially spherical shell shape and surrounding the first region, and the second region having the second refractive index n2 and positioned on the side of the refractive index modulation region opposite to the first region; and optimizing the first region, the second region, and the refractive index modulation region so that the expressions (1) and (2) are satisfied.

BRIEF DESCRIPTION OF DRAWINGS

FIG. 12 is a schematic diagram for illustrating a method of calculating a half-value angle in the present invention.

FIGS. 18(a) to 18(c) are graphs of simulations each showing a relationship between an average refractive index of a matrix and a refractive index of a light diffusing fine particle, and backscattering.

FIGS. 19(a) and 19(b) are graphs of simulations each showing a relationship between an average refractive index of a matrix and a refractive index of a light diffusing fine particle, and diffusibility and backscattering.

FIGS. 20(a) and 20(b) are graphs of simulations each showing a relationship between an average refractive index of a matrix and a refractive index of a light diffusing fine particle, and diffusibility and backscattering.

FIGS. 21(a) and 21(b) are graphs of simulations each showing a relationship between an average refractive index of a matrix and a refractive index of a light diffusing fine particle, and diffusibility and backscattering.

DESCRIPTION OF EMBODIMENTS

Figure 1A:
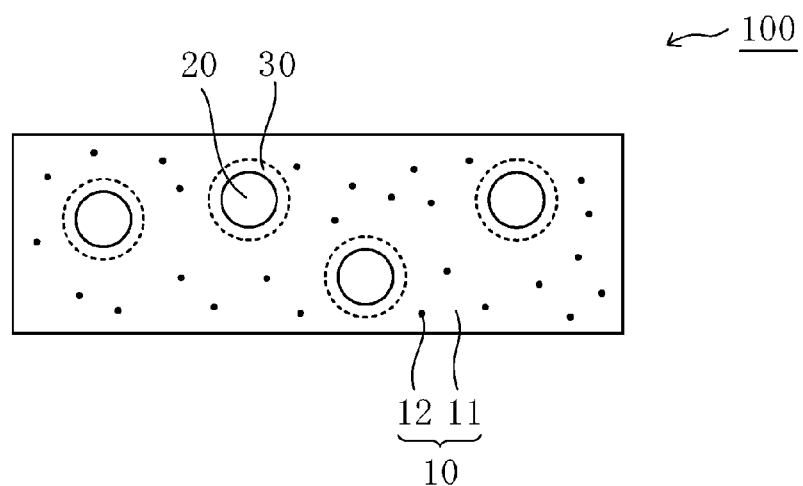
FIG. 1A is a schematic cross-sectional view of a light diffusing element according to a preferred embodiment of the present invention.

Hereinafter, preferred embodiments of the present invention are described with reference to the drawings. However, the present invention is not limited to these specific embodiments.

A. Light Diffusing Element

A-1. Entire Construction

A light diffusing element according to an embodiment of the present invention includes a first region having a first refractive index n1 and a second region having a second refractive index n2. The light diffusing element of the present embodiment expresses a light diffusing function by virtue of the refractive index difference between the first region and the second region. In the present invention, the first region is surrounded by a refractive index modulation region having a substantially spherical shell shape, and the second region is formed so as to be positioned on a side of the refractive index modulation region opposite to the first region. Thus, the light diffusing element of the present embodiment has such an external appearance that the first region surrounded by the refractive index modulation region is dispersed in the second region. In the refractive index modulation region, a refractive index changes substantially continuously. The phrase "refractive index changes substantially continuously" as used herein means that the refractive index only needs to change substantially continuously in the refractive index modulation region. Therefore, for example, even when a refractive index gap in a predetermined range (for example, a refractive index difference of 0.05 or less) is present at an interface between the first region and the refractive index modulation region and/or an interface between the refractive index modulation region and the second region, the gap is permissible.

In the present invention, the light diffusing element satisfies the following expressions (1) and (2):

$$0.0006 \leq \Delta n/L \quad (1)$$

$$10 \leq (\Delta n)^2 \times A \times B \leq 100 \quad (2)$$

where Δn represents the absolute value |n1−n2| of a difference between the first refractive index n1 and the second refractive index n2, L (nm) represents the average thickness of the refractive index modulation region, the unit of Δn/L is (nm$^{-1}$), A represents the number of parts by weight of a material forming the first region with respect to 100 parts by weight of the entire light diffusing element, and B represents the number of parts by weight of a material forming the second region with respect to 100 parts by weight of the entire light diffusing element. According to an embodiment of the present invention, by optimizing the refractive index modulation region as well as the first region and the second region so that the expressions (1) and (2) are satisfied, a light diffusing element made of a thin film capable of realizing low backscattering and a high haze can be obtained. More specifically, by setting Δn/L to a predetermined value or more (forming a refractive index modulation region the change in refractive index of which is steep) to reduce a space occupied by the refractive index modulation region, thereby enhancing a presence ratio of the first region, scattering efficiency is enhanced, and a high haze (excellent light diffusibility) can be realized in spite of a thin film. Further, by virtue of the synergistic effect of the foregoing and suppression of backscattering by the refractive index modulation region, a light diffusing element made of a thin film capable of realizing low backscattering and a high haze can be obtained.

Δn is preferably 0.08 or more, more preferably 0.10 or more. The upper limit of Δn is, for example, 0.30. When Δn is less than 0.08, sufficiently large (Δn)$^2$×A×B is not obtained, and hence, a light diffusing element which is made of a thin film and has strong light diffusibility is not obtained (for example, the haze becomes 90% or less) in most cases. As a result, there is a possibility that light from a light source cannot be diffused sufficiently when the light diffusing element is incorporated into a liquid crystal display device, and a viewing angle may become small. When Δn is more than 0.30, even when the refractive index modulation region is formed, there is a possibility that backscattering cannot be suppressed sufficiently, and backscattering may increase. Further, it becomes difficult to select materials for forming the first region and the second region in some cases. The average thickness L of the refractive index modulation region capable of realizing such Δn/L is preferably 5 nm to 500 nm, more preferably 12 nm to 400 nm, still more preferably 15 nm to 300 nm. When the average thickness L is less than 5 nm, backscattering increases in some cases. When the average thickness L is more than 500 nm, the first region or the second region decreases in some cases, with a result that sufficient (Δn)$^2$×A×B cannot be obtained, and a light diffusing element which is made of a thin film and has strong light diffusibility may not be obtained.

Δn/L is preferably 0.0006 to 0.01. When Δn/L is less than 0.0006, Δn is less than 0.08 or L is more than 500 nm in most cases. Therefore, backscattering increases and a light diffusing element which is made of a thin film and has strong light diffusibility is not obtained in most cases. When Δn/L is more than 0.01, it is difficult to change the refractive index substantially continuously in the refractive index modulation region in some cases.

(Δn)$^2$×A×B is 10 to 100 as expressed by the expression (2), preferably 20 to 50. When (Δn)$^2$×A×B is less than 10, a light diffusing element which is made of a thin film and has strong light diffusibility is not obtained in most cases. When (Δn)$^2$×A×B is more than 100, Δn is more than 0.3 in most cases, with a result that backscattering may not be suppressed effectively. The technical significance of optimizing the value of (Δn)$^2$×A×B in the range of the expression (2) is described below. In the light diffusing element of the present embodiment, a preferred diameter of a light diffusing fine particle is 1 μm to 10 μm, as described later. It is known that light scattering which occurs in such particle diameter range is in a region of Mie scattering, and the intensity of the light scattering is proportional to the square of Δn in the region of Mie scattering. On the other hand, according to general scattering theory of an electromagnetic wave, which is not limited to light, the intensity of scattering of an object when fluctuation in electron density (refractive index in the case of light) of a volume fraction φ is present in a matrix is proportional to φ×(1−φ). This is because, when φ is more than 50%, a matrix component becomes a minor component, and a scattering component becomes dominant, compared with the matrix. Similarly, when the number of parts by weight of a material having a first refractive index (material forming the first region) is defined as A, and the number of parts by weight of a material having a second refractive index (material forming the second region) is defined as B, the intensity of light diffusion is proportional to A×B. That is, it is necessary that a sufficient amount of the first region (for example, light diffusing fine particles) be present in the second region (for example, a matrix), and a sufficient amount of the second region be present around the first region. Herein, in the case where a refractive index modulation region in which the refractive index changes from the first refractive index to the second refractive index is present at an interface between the first region and the second region, the refractive index modulation region does not contribute to the intensity of light diffusion while functioning so as to suppress backscattering. That is, when the refractive index modulation region (that is, a region that is neither A nor B) is present in a great amount in the light diffusing element, the first region or the second region decreases. Therefore, even when backscattering can be suppressed, it is difficult to obtain a light diffusing element which is thin and has strong light diffusibility. According to an embodiment of the present invention, by optimizing $\Delta n/L$ so that $\Delta n/L$ satisfies the expression (1), and optimizing $(\Delta n)^2 \times A \times B$ so that $(\Delta n)^2 \times A \times B$ satisfies the expression (2), a light diffusing element made of a thin film having light diffusibility (high haze) and less backscattering can be obtained.

The number of parts by weight A of the material forming the first region is preferably 10 parts by weight to 60 parts by weight, more preferably 15 parts by weight to 50 parts by weight with respect to 100 parts by weight of the entire light diffusing element. The number of parts by weight B of the material forming the second region is preferably 40 parts by weight to 90 parts by weight, more preferably 50 parts by weight to 85 parts by weight with respect to 100 parts by weight of the entire light diffusing element. When the number of parts by weight A or B is out of such a range, there is a possibility that sufficiently large $\Delta n^2 \times A \times B$ cannot be obtained and a light diffusing element which is made of a thin film and has strong light diffusibility cannot be obtained. Further, when the number of parts by weight A is more than 60 parts by weight or the number of parts by weight B is less than 40 parts by weight, there is a possibility that the surface of the light diffusing element may form unevenness due to the shapes of light diffusing fine particles, and strong backscattering may occur from the surface of the light diffusing element. According to an embodiment of the present invention, a refractive index gradient of the refractive index modulation region present between the first region (for example, light diffusing fine particles) and the second region (for example, a matrix) is sufficiently steep, and hence, a small ratio of the refractive index modulation region occupying the light diffusing element suffices, with a result that the first region and the second region can be ensured which are sufficient for obtaining strong light diffusibility in spite of a thin film. The number of parts by weight C occupied by the refractive index modulation region in the light diffusing element of the present embodiment is preferably 1 part by weight to 20 parts by weight, more preferably 1 part by weight to 5 parts by weight with respect to 100 parts by weight of the entire light diffusing element. Further, a ratio (C/A) of the number of parts by weight C to the number of parts by weight A is preferably 5% to 100%.

The first region, the second region, and the refractive index modulation region can be formed by any suitable means. Examples thereof include the following means: (1) dispersing, in a resin, refractive index gradient fine particles such as so-called GRIN fine particles the refractive index of which changes continuously from the center portion of the fine particles to an outer side, and using a refractive index gradient portion as a refractive index modulation region; and (2) forming a refractive index modulation region at an interface between a matrix and each of light diffusing fine particles or in the vicinity thereof by a substantial gradient of dispersion concentration of an ultrafine particle component through use of a resin component and the ultrafine particle component in the matrix. An embodiment using the resin component and the ultrafine particle component in the matrix is hereinafter described mainly, and an embodiment using the refractive index gradient fine particles is described briefly only with respect to its characteristic portions.

In one embodiment, the light diffusing element of the present invention includes a matrix and light diffusing fine particles dispersed in the matrix, and a refractive index modulation region the refractive index of which changes substantially continuously is formed in an external portion in the vicinity of the surface of each of the light diffusing fine particles. That is, the light diffusing fine particles correspond to the first region, and the matrix corresponds to the second region. The light diffusing element according to this embodiment expresses a light diffusing function by virtue of the refractive index difference between the matrix and each of the light diffusing fine particles. As described above, the refractive index modulation region is formed in an external portion in the vicinity of the surface of each of the light diffusing fine particles, and hence, the matrix includes the refractive index modulation region in an external portion in the vicinity of the surface of each of the light diffusing fine particles and a refractive index constant region on the outside (side away from the light diffusing fine particles) of the refractive index modulation regions. Preferably, a portion of the matrix other than the refractive index modulation region is substantially the refractive index constant region. As described above, the phrase "refractive index changes substantially continuously" as used herein means that the refractive index only needs to change substantially continuously at least from the surface of each of the light diffusing fine particles to the refractive index constant region in the refractive index modulation region. Thus, for example, even when a refractive index gap in a predetermined range (for example, a refractive index difference of 0.05 or less) is present at an interface between each of the light diffusing fine particles and the refractive index modulation region and/or an interface between the refractive index modulation region and the refractive index constant region, the gap is permissible.

In this embodiment, in the expressions (1) and (2): $\Delta n$ represents the absolute value $|n_M - n_P|$ of a difference between the average refractive index $n_M$ of the matrix and the refractive index $n_P$ of each of the light diffusing fine particles; L (nm) represents the average thickness of the refractive index modulation region; the unit of $\Delta n/L$ is $(nm^{-1})$; A represents the number of parts by weight of the light diffusing fine particles with respect to 100 parts by weight of the entire light diffusing element; and B represents the number of parts by weight of the matrix with respect to 100 parts by weight of the entire light diffusing element. It is preferred that the relationship of $n_M > n_P$ be satisfied. It should be noted that, in this embodiment, only in the case of referring to the expression (2), the matrix means a portion of the light diffusing element excluding the light diffusing fine particles and the refractive index modulation region (that is, the refractive index constant region).

Figure 1B:
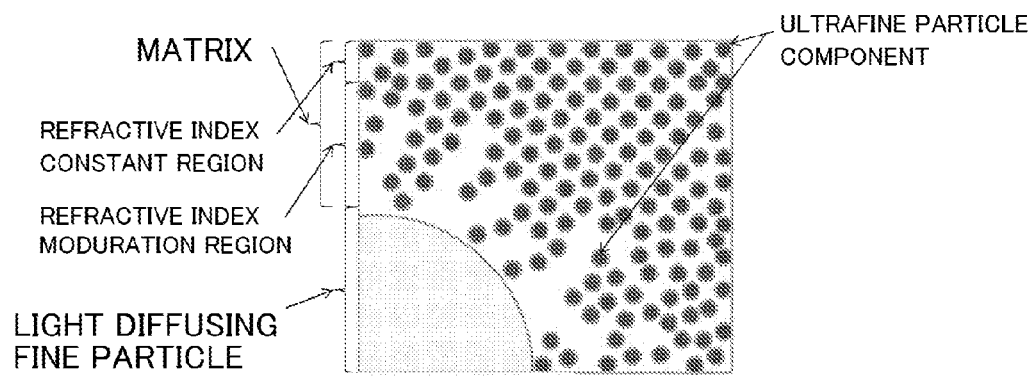
FIG. 1B is an enlarged schematic view illustrating the vicinity of a light diffusing fine particle in the light diffusing element of FIG. 1A.

FIG. 1A is a schematic cross-sectional view of the light diffusing element according to this embodiment, and FIG. 1B is an enlarged schematic view illustrating the vicinity of the light diffusing fine particle in the light diffusing element of FIG. 1A. It is preferred that the matrix include a resin component and an ultrafine particle component. A light diffusing element 100 of FIG. 1A includes a matrix 10 including a resin component 11 and an ultrafine particle component 12, and light diffusing fine particles 20 dispersed in the matrix 10. In FIG. 1A, a refractive index modulation region 30 is formed in an external portion in the vicinity of the surface of each of the light diffusing fine particles 20. In the refractive index modulation region 30, the refractive index changes substantially continuously as described above.

Figure 2:
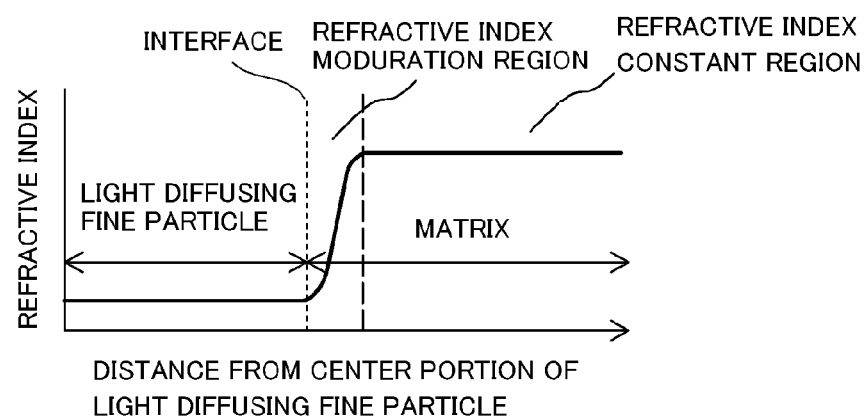
FIG. 2 is a conceptual diagram for illustrating a change in refractive index from a center portion of the light diffusing fine particle to a matrix in the light diffusing element of FIG. 1A.

Preferably, in the refractive index modulation region 30, the refractive index changes substantially continuously, and in addition, a refractive index in an outermost portion of the refractive index modulation region and a refractive index of the refractive index constant region are substantially identical. In other words, in the light diffusing element according to this embodiment, the refractive index changes continuously from the refractive index modulation region to the refractive index constant region, and preferably, the refractive index changes continuously from the light diffusing fine particle to the refractive index constant region (FIG. 2). Preferably, the change in refractive index is smooth as illustrated in FIG. 2. That is, the refractive index changes in such a shape that a tangent can be drawn on a refractive index change curve in a boundary between the refractive index modulation region and the refractive index constant region. Preferably, in the refractive index modulation region, the gradient of the change in refractive index increases with increasing distance from the light diffusing fine particle. According to this embodiment, as described later, by appropriately selecting the light diffusing fine particles, and the resin component and the ultrafine particle component of the matrix, a substantially continuous change in refractive index can be realized. One of the features of the present invention lies in that the change in refractive index, which is steep as described above ($\Delta n/L$ is very large) and which is substantially continuous, is realized. As a result, even when a refractive index difference between the matrix 10 (substantially, the refractive index constant region) and the light diffusing fine particles 20 is increased, reflection at an interface between the matrix 10 and each of the light diffusing fine particles 20 can be suppressed, and backscattering can be suppressed. Further, in the refractive index constant region, the weight concentration of the ultrafine particle component 12 the refractive index of which is largely different from that of each of the light diffusing fine particles 20 is relatively high, and hence, the refractive index difference between the matrix 10 (substantially, the refractive index constant region) and each of the light diffusing fine particles 20 can be increased. In addition, in the light diffusing element according to this embodiment, by satisfying the expression (1), a presence ratio of the light diffusing fine particles can be increased, and scattering efficiency can be enhanced. As a result, even a thin film can realize a high haze (strong diffusibility). Thus, according to the light diffusing element according to this embodiment, even in the thin film, the refractive index difference can be increased to realize a high haze and backscattering can be suppressed remarkably. Such feature is particularly suitable in an application that requires strong diffusibility (haze of 90% or more) such as a light diffusing element used in a collimated backlight front diffusing system. On the other hand, according to the conventional light diffusing element having formed therein no refractive index modulation region, when an attempt is made to impart strong diffusibility (high haze value) by increasing a refractive index difference, the gap between refractive indices at an interface cannot be eliminated. Consequently, backscattering caused by reflection at an interface between a light diffusing fine particle and a matrix increases, which often results in that a black display may not become black sufficiently (that is, a black color may get out of harmony) in the presence of outside light. According to an embodiment of the present invention, by satisfying the expressions (1) and (2), and forming the refractive index modulation region the refractive index of which changes substantially continuously, the above-mentioned problems in the related art can be solved, and a light diffusing element made of a thin film can be obtained, which has a high haze value and strong diffusibility and in which backscattering is suppressed.

Preferably, the light diffusing element 100 satisfies the expression (3):

$$0.005 \leq L/r_P \leq 0.40 \tag{3}$$

where $r_P$ represents the radius (nm) of the light diffusing fine particle. $L/r_P$ is more preferably 0.02 to 0.15. When $L/r_P$ is less than 0.005, a refractive index modulation region with a sufficient thickness is not formed, and hence, backscattering cannot be suppressed satisfactorily in most cases. When $L/r_P$ is more than 0.40, sufficiently large $\Delta n^2 \times A \times B$ is not obtained in most cases. Moreover, $\Delta n/L$ becomes small, and hence, a light diffusing element which is made of a thin film and has strong light diffusibility cannot be obtained in some cases. According to an embodiment of the present invention, the average thickness L of the refractive index modulation region can be set to be very small as described above, and hence, $L/r_P$ can be set to be very small. As a result, backscattering can be suppressed satisfactorily while scattering ability of each of the light diffusing fine particles is kept sufficiently. Thus, a high haze (strong diffusibility) can be realized in spite of a thin film.

The thickness of the refractive index modulation region 30 (distance from the innermost portion of the refractive index modulation region to the outermost portion of the refractive index modulation region) may be constant (that is, the refractive index modulation region may spread to the circumference of the light diffusing fine particle in a concentric sphere shape), or the thickness may vary depending upon the position of the surface of the light diffusing fine particle (for example, the refractive index modulation region may have a contour shape of a candy called confetti). Preferably, the thickness of the refractive index modulation region 30 varies depending upon the position of the surface of the light diffusing fine particle. With such construction, the refractive index can be changed more smoothly and continuously in the refractive index modulation region. The average thickness L is an average thickness in the case where the thickness of the refractive index modulation region 30 varies depending upon the position of the surface of the light diffusing fine particle, and in the case where the thickness is constant, the constant thickness is the average thickness L.

Figure 3:
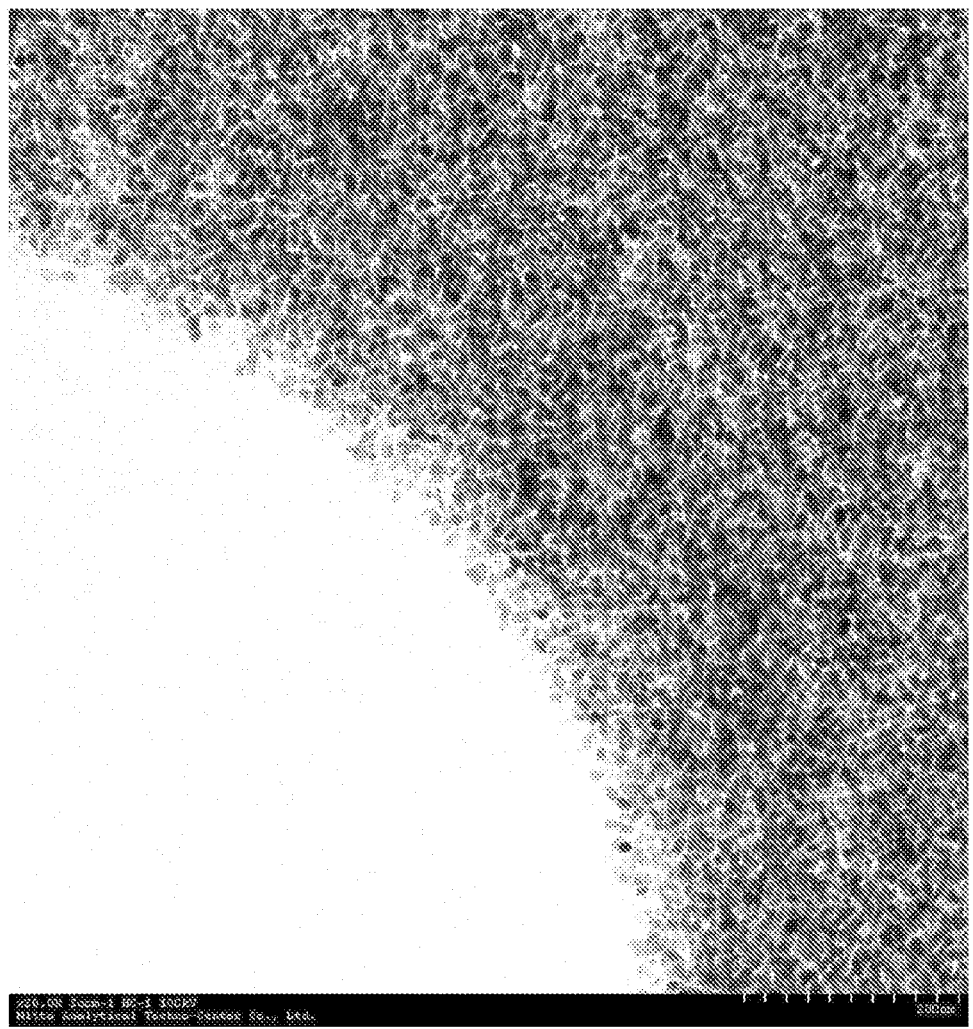
FIG. 3 is a transmission electron microscope image for showing an area ratio of an ultrafine particle component in the matrix.

As described above, the matrix 10 preferably includes the resin component 11 and the ultrafine particle component 12. Preferably, the refractive index modulation region 30 is formed by a substantial gradient of dispersion concentration of the ultrafine particle component 12 in the matrix 10. Specifically, in the refractive index modulation region 30, the dispersion concentration (typically, defined in terms of weight concentration) of the ultrafine particle component 12 increases (inevitably, the weight concentration of the resin component 11 decreases) with increasing distance from the light diffusing fine particle 20. In other words, in a region of the refractive index modulation region 30 closest to the light diffusing fine particle 20, the ultrafine particle component 12 is dispersed at a relatively low concentration, and the concentration of the ultrafine particle component 12 increases with increasing distance from the light diffusing fine particle 20. For example, an area ratio of the ultrafine particle component 12 in the matrix 10 according to a transmission electron microscope (TEM) image is small on a side close to the light diffusing fine particle 20 and large on a side close to the matrix 10. Thus, the area ratio varies while forming a substantial gradient from the light diffusing fine particle side to the matrix side (refractive index constant region side). FIG. 3 shows a TEM image showing its typical dispersion state. The phrase "area ratio of an ultrafine particle component in a matrix according to a transmission electron microscope image" as used herein refers to a ratio of the area of the ultrafine particle component occupying the matrix in a predetermined range (predetermined area) in a transmission electron microscope image of a cross-section including the diameter of the light diffusing fine particle. The area ratio corresponds to the three-dimensional dispersion concentration (actual dispersion concentration) of the ultrafine particle component. For example, with the above-mentioned area ratio, the gradient of a change in the dispersion concentration of the ultrafine particle component 12 is small on a side close to the light diffusing fine particle 20 and large on a side close to the refractive index constant region. Thus, the dispersion concentration of the ultrafine particle component 12 changes while forming a substantial gradient from the light diffusing fine particle side to the refractive index constant region side. In other words, the gradient of the change in the dispersion concentration of the ultrafine particle component 12 increases with increasing distance from the light diffusing fine particle. The area ratio of the ultrafine particle component can be determined by any suitable image analysis software. It should be noted that the area ratio typically corresponds to an average shortest distance between respective particles of the ultrafine particle component. Specifically, the average shortest distance between the respective particles of the ultrafine particle component decreases with increasing distance from the light diffusing fine particle in the refractive index modulation region, and becomes constant in the refractive index constant region (for example, the average shortest distance is about 3 nm to 100 nm in a region closest to the light diffusing fine particle and 1 nm to 20 nm in the refractive index constant region). The average shortest distance can be calculated by binarizing a TEM image in a dispersion state as illustrated in FIG. 3 and employing, for example, the inter-centroid distance method of image analysis software "A-zo-kun" (manufactured by Asahi Kasei Engineering Corporation). As described above, according to this embodiment, the refractive index modulation region 30 can be formed in the vicinity of an interface between the matrix and the light diffusing fine particle through use of a substantial gradient of dispersion concentration of the ultrafine particle component 12, and hence, the light diffusing element can be produced by a simple procedure at low cost. Further, by forming the refractive index modulation region through use of a substantial gradient of dispersion concentration of the ultrafine particle component, the refractive index is allowed to change smoothly in a boundary between the refractive index modulation region 30 and the refractive index constant region. Further, the refractive index difference between the light diffusing fine particle and the matrix (substantially, the refractive index constant region) can be increased, and the refractive index gradient of the refractive index modulation region can be made steep through use of the ultrafine particle component the refractive index of which is largely different from those of the resin component and the light diffusing fine particle.

The refractive index modulation region (substantially, the substantial gradient of dispersion concentration of the ultrafine particle component as described above) can be formed by appropriately selecting materials for forming the resin component and the ultrafine particle component of the matrix, and the light diffusing fine particles, and chemical and thermodynamic properties. For example, by forming the resin component and the light diffusing fine particles through use of materials of the same type (for example, organic compounds), and forming the ultrafine particle component through use a material (for example, an inorganic compound) of a different type from those of the resin component and the light diffusing fine particles, the refractive index modulation region can be formed satisfactorily. Further, for example, it is preferred that the resin component and the light diffusing fine particles be formed of materials having high compatibility with each other among the materials of the same type. The thickness and refractive index gradient of the refractive index modulation region can be controlled by adjusting the chemical and thermodynamic properties of the resin component and the ultrafine particle component of the matrix, and the light diffusing fine particles. It should be noted that the term "same type" as used herein means that chemical structures and properties are equivalent or similar, and the term "different type" refers to a type other than the same type. Whether or not materials are of the same type varies depending upon the way of selecting a standard. For example, based on whether materials are organic or inorganic, organic compounds are compounds of the same type, and an organic compound and an inorganic compound are compounds of different types. Based on a repeating unit of a polymer, for example, an acrylic polymer and an epoxy-based polymer are compounds of different types in spite of the fact that they are both organic compounds. Based on the periodic table, an alkaline metal and a transition metal are elements of different types in spite of the fact that they are both inorganic elements.

More specifically, the substantial gradient of dispersion concentration of the ultrafine particle component as described above can be realized by the following method (1) or (2), or an appropriate combination thereof: (1) The dispersion concentration of the ultrafine particle component in the matrix is adjusted. For example, by increasing the dispersion concentration of the ultrafine particle component, electrical repulsion between the ultrafine particle components becomes large. As a result, the ultrafine particle component ends up being present even in the vicinity of each of the light diffusing fine particles, and a steep refractive index gradient can be formed in the refractive index modulation region (thickness of the refractive index modulation region becomes small). (2) The cross-linking degree of the light diffusing fine particles is adjusted. For example, in light diffusing fine particles with a low cross-linking degree, a degree of freedom of constituent polymer molecules on the surfaces of the fine particles becomes high, and hence, the ultrafine particle component cannot approach the light diffusing fine particles easily. As a result, a gentle refractive index gradient can be formed in the refractive index modulation region (thickness of the refractive index modulation region becomes large). Preferably, by appropriately combining the methods (1) and (2), the substantial gradient of dispersion concentration of the ultrafine particle component as described can be realized. For example, by using an ultrafine particle component of zirconia and light diffusing fine particles of PMMA, setting the dispersion concentration of the ultrafine particle component to 30 parts by weight to 70 parts by weight with respect to 100 parts by weight of the matrix, and using light diffusing fine particles with a swelling degree of 100% to 200% with respect to a resin component precursor described later, there can be realized a dispersion concentration gradient in which the dispersion concentration of the ultrafine particle component 12 in the matrix 10 is small on a side close to the light diffusing fine particles 20 and large on a side close to the refractive index constant region, and changes while forming a substantial gradient from the light diffusing fine particle side to the refractive index constant region side. Further, there can be formed a refractive index modulation region (for example, as in an outer shape of confetti) in which the thickness varies depending upon the position of the surface of the light diffusing fine particle. Herein, the term "swelling degree" refers to a ratio of an average particle diameter of each of the particles in a swollen state with respect to the average particle diameter of each of the particles before being swollen.

Figure 4:
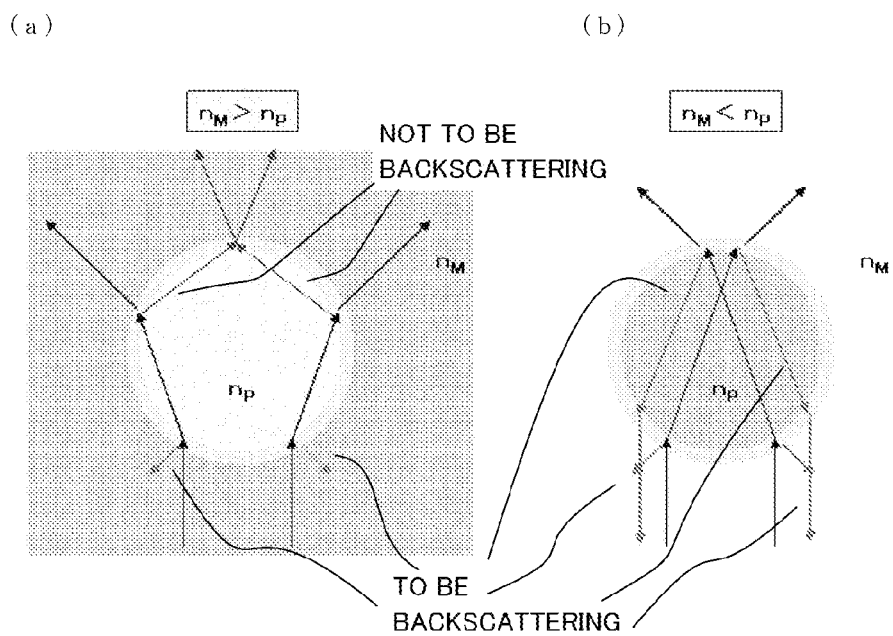
FIG. 4(a) is a conceptual diagram for illustrating a mechanism for the occurrence of backscattering in the case where the relationship of "average refractive index $n_M$ of matrix>refractive index $n_P$ of light diffusing fine particle" is satisfied.
FIG. 4(b) is a conceptual diagram for illustrating a mechanism for the occurrence of backscattering in the case where $n_M<n_P$.

As described above, in the light diffusing element 100 according to this embodiment, it is preferred that the relationship of $n_M > n_P$ be satisfied. As illustrated in the comparison between FIGS. 4(a) and 4(b), in the case where the relationship of $n_M > n_P$ is satisfied, backscattering can be suppressed more satisfactorily even when the refractive index gradient of the refractive index modulation region is steep, compared with the case where $n_M < n_P$ is satisfied.

The light diffusion property of the light diffusing element of the present embodiment is typically expressed by a haze and a light diffusion half-value angle. The haze indicates intensity of light diffusion, that is, a diffusion degree of incident light. On the other hand, the light diffusion half-value angle indicates quality of diffusion light, that is, an angle range of light to be diffused. The light diffusing element of the present embodiment exhibits its effects sufficiently when the haze is high. The haze of the light diffusing element is preferably 90% or more, more preferably 90% to 99.9%, still more preferably 92% to 99.9%, particularly preferably 95% to 99.9%, even more preferably 96% to 99.9%, most preferably 97% to 99.9%. When the haze is 90% or more, the light diffusing element can be suitably used as a front light diffusing element in a collimated backlight front diffusing system. Further, when the light diffusing element is used as a polarizing element on a backlight side, brightness unevenness of a lamp image or the like can be eliminated satisfactorily. Further, when the light diffusing element is used in a liquid crystal display device including a front substrate (for example, a touch panel), the light diffusing element functions as a screen sufficiently, and hence, parallax can be reduced. It is preferred to use the light diffusing element particularly in a liquid crystal display device using a collimated light source device, because both the enhancement of a front contrast ratio and the reduction in parallax can be achieved. According to an embodiment of the present invention, a light diffusing element which has a very high haze and in which backscattering is suppressed as described above can be obtained. It should be noted that the collimated backlight front diffusing system refers to a system in which a front light diffusing element is provided on a viewer side of an upper polarizing plate, using collimated backlight (backlight with a narrow brightness half-width (e.g., 3° to 35° or ±1.5° to)±17.5° condensed in a predetermined direction) in a liquid crystal display device. The haze can be determined in accordance with JIS 7136.

The light diffusion property of the light diffusing element is preferably 10° to 150° (5° to 75° on one side), more preferably 10° to 100° (5° to 50° on one side), still more preferably 30° to 80° (15° to 40° on one side) in terms of a light diffusion half-value angle. When the light diffusion half-value angle is too small, an oblique viewing angle (for example, white brightness) may become narrow in some cases. When the light diffusion half-value angle is too large, backscattering may become large in some cases. When the light diffusing element is used as a polarizing element on a backlight side, the light diffusion half-value angle is preferably 25° (12.5° on one side) or more, more preferably 30° to 140° (15° to 70° on one side), still more preferably 50° to 120° (25° to 60° on one side).

It is preferred that the light diffusing element have a lowest possible backscattering ratio. Specifically, the backscattering ratio is preferably 0.5% or less. It should be noted that, when the light diffusing element is used as a backlight side polarizing element, the backscattering ratio only needs to be about 3% or less, more preferably 2% or less.

The thickness of the light diffusing element can be set appropriately depending upon purposes and desired diffusion property. Specifically, the thickness of the light diffusing element is preferably 3 μm to 50 μm, more preferably 4 μm to 50 μm, still more preferably 4 μm to 30 μm, particularly preferably 4 μm to 20 μm. According to an embodiment of the present invention, a light diffusing element having a very high haze (excellent light diffusibility) as described above in spite of such very small thickness can be obtained. Further, with such small thickness, the light diffusing element is not cracked even when it is bent, and can be stored in a roll shape. In addition, as described later, the light diffusing element of the present embodiment can be formed by application, and hence, for example, the production of the light diffusing element and the attachment thereof to a polarizing plate can be performed continuously through so-called roll-to-roll. Thus, the light diffusing element of the present embodiment is very excellent in productivity of the light diffusing element itself and has very high production efficiency of attachment to other optical members such as a polarizing plate. The roll-to-roll refers to a process of attaching long films to each other continuously with their longitudinal directions being aligned while conveying the films with rolls.

The light diffusing element is used preferably in a liquid crystal display device, particularly preferably in a liquid crystal display device employing a collimated backlight front diffusing system and that including a front substrate. The light diffusing element may be provided as a film-shaped or plate-shaped member alone, or may be attached to any appropriate base material or polarizing plate and provided as a composite member. Further, a reflection preventing layer may be laminated on the light diffusing element. Further, the light diffusing element may also be used preferably in a backlight portion of a liquid crystal display device.

A-2. Matrix

As described above, the matrix 10 preferably includes the resin component 11 and the ultrafine particle component 12. As described above and as illustrated in FIGS. 1A, and 1B, the ultrafine particle component 12 is dispersed in the resin component 11 so as to form the refractive index modulation region 30 in the vicinity of the interface between the matrix 10 and the light diffusing fine particle 20.

A-2-1. Resin Component

The resin component 11 is formed of any suitable material as long as the refractive index modulation region is formed. Preferably, as described above, the resin component 11 is formed of a compound that is of the same type as that of each of the light diffusing fine particles and that is of a different type from that of the ultrafine particle component. With this, the refractive index modulation region can be formed satisfactorily in the vicinity of the interface between the matrix and each of the light diffusing fine particles (in the vicinity of the surface of each of the light diffusing fine particles). More preferably, the resin component 11 is formed of a compound having high compatibility with each of the light diffusing fine particles, among those of the same type. With this, the refractive index modulation region having a desired gradient of the refractive index can be formed. More specifically, in the vicinity of the light diffusing fine particle, energy of the entire system becomes more stable in most cases when the light diffusing fine particle is surrounded only by the resin component locally, than when the resin component is uniformly dissolved or dispersed with the ultrafine particle component. As a result, in the region closest to the light diffusing fine particle, the weight concentration of the resin component is higher than the average weight concentration of the resin component in the entire matrix and decreases with increasing distance from the light diffusing fine particle. Thus, the refractive index modulation region can be formed satisfactorily in the vicinity of the interface (in the vicinity of the surface of the light diffusing fine particle) between the matrix and the light diffusing fine particle.

The resin component is formed of preferably an organic compound, more preferably an ionizing radiation-curable resin. The ionizing radiation-curable resin is excellent in hardness of an applied film, and hence easily compensates for mechanical strength, which is a weak point of the ultrafine particle component described later. Further, when the light diffusing element is used for a polarizing element on the back light side, hard coat property can be imparted to the polarizing element to be obtained. Examples of the ionizing radiation include UV light, visible light, infrared light, and an electron beam. Of those, UV light is preferred, and thus, the resin component is particularly preferably formed of a UV-curable resin. Examples of the UV-curable resin include resins formed of radical-polymerizable monomers and/or oligomers such as an acrylate resin (epoxy acrylate, polyester acrylate, acrylic acrylate, or ether acrylate). A monomer component (precursor) that constructs the acrylate resin preferably has a molecular weight of 200 to 700. Specific examples of the monomer component (precursor) that constructs the acrylate resin include pentaerythritol triacrylate (PETA, molecular weight: 298), neopentylglycol diacrylate (NPGDA, molecular weight: 212), dipentaerythritol hexaacrylate (DPHA, molecular weight: 632), dipentaerythritol pentaacrylate (DPPA, molecular weight: 578), and trimethylolpropane triacrylate (TMPTA, molecular weight: 296). If required, an initiator may be added to the precursor. Examples of the initiator include a UV radial generator (e.g., Irgacure 907, 127, or 192 manufactured by BASF Japan Ltd.) and benzoyl peroxide. The resin component may contain another resin component other than the ionizing radiation-curable resin. The another resin component may be an ionizing radiation-curable resin, a thermosetting resin, or a thermoplastic resin. Typical examples of the another resin component include an aliphatic (for example, polyolefin) resin and a urethane-based resin. In the case of using the another resin component, the kind and blending amount thereof are adjusted so that the refractive index modulation region is formed satisfactorily.

The resin component typically satisfies the following expression (4):

$$|n_P - n_A| < |n_P n_B| \tag{4}$$

in the formula (4), $n_A$ represents a refractive index of a resin component of a matrix, $n_B$ represents a refractive index of an ultrafine particle component of the matrix, and $n_P$ represents a refractive index of a light diffusing fine particle. Further, the resin component may also satisfy the following expression (5).

$$|n_P - n_A| < |n_A - n_B| \tag{5}$$

The refractive index of the resin component is preferably 1.40 to 1.60.

The blending amount of the resin component is preferably 10 parts by weight to 80 parts by weight, more preferably 20 parts by weight to 80 parts by weight, still more preferably 20 parts by weight to 65 parts by weight, particularly preferably 45 parts by weight to 65 parts by weight with respect to 100 parts by weight of the matrix. With such blending amount, the expression (2) can be satisfied.

A-2-2. Ultrafine Particle Component

As described above, the ultrafine particle component 12 is formed of preferably a compound of a different type from those of the resin component described above and the light diffusing fine particles described later, more preferably an inorganic compound. Preferred examples of the inorganic compound include a metal oxide and a metal fluoride. Specific examples of the metal oxide include zirconium oxide (zirconia) (refractive index: 2.19), aluminum oxide (refractive index: 1.56 to 2.62), titanium oxide (refractive index: 2.49 to 2.74), and silicon oxide (refractive index: 1.25 to 1.46). Specific example of the metal fluoride include magnesium fluoride (refractive index: 1.37) and calcium fluoride (refractive index: 1.40 to 1.43). These metal oxides and metal fluorides absorb less light and each have a refractive index which is difficult to be expressed with organic compounds such as the ionizing radiation-curable resin and the thermoplastic resin. Therefore, the weight concentration of the ultrafine particle component becomes relatively higher with increasing distance from the interface with each of the light diffusing fine particles, and thus, the metal oxides and metal fluorides can change the refractive index largely. By setting a refractive index difference between each of the light diffusing fine particles and the matrix to be large, a high haze (high light diffusibility) can be realized even with a thin film, and the effect of preventing backscattering is large because the refractive index modulation region is formed. Zirconium oxide is a particularly preferred inorganic compound.

The ultrafine particle component may also satisfy the expressions (4) and (5). The refractive index of the ultrafine particle component is preferably 1.40 or less or 1.60 or more, more preferably 1.40 or less or 1.70 to 2.80, particularly preferably 1.40 or less or 2.00 to 2.80. When the refractive index is more than 1.40 or less than 1.60, the refractive index difference between each of the light diffusing fine particles and the matrix becomes insufficient, which may lead to insufficient light diffusibility, and in the case where the light diffusing element is used in a liquid crystal display device adopting a collimated backlight front diffusing system, light from a collimated backlight cannot be diffused enough, which may narrow a viewing angle.

It is preferred that an average primary particle diameter of the ultrafine particle component be small relative to the average thickness L of the refractive index modulation region. More specifically, the average primary particle diameter is preferably 1/50 to 1/2, more preferably 1/25 to 1/3 with respect to the average thickness L. When the average primary particle diameter is more than 1/2 with respect to the average thickness L, the refractive index in the refractive index modulation region does not change substantially continuously in some cases. When the average primary particle diameter is less than 1/50, it may be difficult to form the refractive index modulation region in some cases. The average primary particle diameter is preferably 1 nm to 100 nm, more preferably 1 nm to 50 nm. The ultrafine particle component may form a secondary aggregate, and the average particle diameter (average particle diameter of the aggregate) in that case is preferably 10 nm to 100 nm, more preferably 10 nm to 80 nm, still more preferably 20 nm to 70 nm. As described above, by using the ultrafine particle component with an average particle diameter smaller than the wavelength of light, geometric reflection, refraction, and scattering are not caused between the ultrafine particle component and the resin component, and a matrix that is optically uniform can be obtained. As a result, a light diffusing element that is optically uniform can be obtained.

It is preferred that the ultrafine particle component have satisfactory dispersibility with the resin component. The term "satisfactory dispersibility" as used herein means that an applied film, which is obtained by applying an application liquid obtained by mixing the resin component, the ultrafine particle component (if required, a small amount of a UV initiator), and a volatile solvent, followed by removing the solvent by drying, is transparent.

Preferably, the ultrafine particle component is subjected to surface modification. By conducting surface modification, the ultrafine particle component can be dispersed satisfactorily in the resin component, and the refractive index modulation region can be formed satisfactorily. As surface modification means, any suitable means can be adopted as long as the effect of the present invention is obtained. Typically, the surface modification is conducted by applying a surface modifier onto the surface of an ultrafine particle component to form a surface modifier layer. Preferred specific examples of the surface modifier include coupling agents such as a silane-based coupling agent and a titanate-based coupling agent, and a surfactant such as a fatty acid-based surfactant. By using such surface modifier, the wettability between the resin component and the ultrafine particle component is enhanced, the interface between the resin component and the ultrafine particle component is stabilized, the ultrafine particle component is dispersed satisfactorily in the resin component, and the refractive index modulation region can be formed satisfactorily.

The blending amount of the ultrafine particle component is preferably 15 parts by weight to 80 parts by weight, more preferably 20 parts by weight to 70 parts by weight with respect to 100 parts by weight of the matrix. When the light diffusing element is used as a polarizing element on a backlight side, the blended amount of the ultrafine particle component is preferably 10 parts by weight to 70 parts by weight, more preferably 35 parts by weight to 55 parts by weight with respect to 100 parts by weight of the matrix. With such blended amount, the expression (2) can be satisfied.

A-3. Light Diffusing Fine Particles

The light diffusing fine particles 20 are also formed of any suitable material, as long as the refractive index modulation region is formed satisfactorily. Preferably, as described above, the light diffusing fine particles 20 are formed of a compound of the same type as that of the resin component of the matrix. For example, in the case where the ionizing radiation-curable resin that constructs the resin component of the matrix is an acrylate-based resin, it is preferred that the light diffusing fine particles be also constructed of the acrylate-based resin. More specifically, when the monomer component of the acrylate-based resin that constructs the resin component of the matrix is, for example, PETA, NPGDA, DPHA, DPPA, and/or TMPTA as described above, the acrylate-based resin that constructs the light-diffusing fine particles is preferably polymethyl methacrylate (PMMA), polymethyl acrylate (PMA), or a copolymer thereof, or a cross-linked product thereof. A copolymerizable component for each of PMMA and PMA is, for example, polyurethane, polystyrene (PS), or a melamine resin. Particularly preferably, the light diffusing fine particles are constructed of PMMA. This is because the relationship in refractive index and thermodynatic properties with respect to the resin component of the matrix and the ultrafine particle component is suitable. Further, preferably, the light diffusing fine particles have a cross-linked structure (three-dimensional network structure). By adjusting coarseness and fineness (cross-linking degree) of the cross-linked structure, a degree of freedom of polymer molecules forming the light diffusing fine particles on the surfaces thereof can be controlled, and hence, the dispersion state of the ultrafine particle components can be controlled, with a result that a refractive index modulation region having a desired refractive index gradient can be formed. For example, the swelling degree of each of the light diffusing fine particles at the time of the application of an application liquid described later with respect to the resin component precursor (which may contain a solvent) is preferably 100% to 200%. Here, the term "swelling degree" is an index of the cross-linking degree and refers to a ratio of an average particle diameter of each of the particles in a swollen state with respect to the average particle diameter of each of the particles before being swollen.

The average particle diameter of each of the light diffusing fine particles is preferably 1 µm to 10 µm, more preferably 2 µm to 5 µm. The average particle diameter of each of the light diffusing fine particles is preferably ½ or less (for example, ½ to 1/20) of the thickness of the light diffusing element. As long as the light diffusing fine particles each have an average particle diameter having such ratio with respect to the thickness of the light diffusing element, a plurality of light diffusing fine particles can be arranged in a thickness direction of the light diffusing element. Therefore, while incident light is passing through the light diffusing element, the incident light can be diffused in a multiple manner, and consequently, sufficient light diffusibility can be obtained.

The standard deviation of a weight average particle diameter distribution of the light diffusing fine particles is preferably 1.0 µm or less, more preferably 0.5 µm or less. When the light diffusing fine particles each having a small particle diameter with respect to the weight average particle diameter are present in a large number, the light diffusibility may increase too much to suppress backscattering satisfactorily. When the light diffusing fine particles each having a large particle diameter with respect to the weight average particle diameter are present in a large number, a plurality of the light diffusing fine particles cannot be arranged in a thickness direction of the light diffusing element, and multiple diffusion may not be obtained. As a result, the light diffusibility may become insufficient.

As the shape of each of the light diffusing fine particles, any suitable shape can be adopted depending upon the purpose. Specific examples thereof include a spherical shape, a scale-like shape, a plate shape, an oval shape, and an amorphous shape. In most cases, spherical fine particles can be used as the light diffusing fine particles.

The light diffusing fine particles may also satisfy the expressions (4) and (5). The refractive index of the light diffusing fine particles is preferably 1.30 to 1.70, more preferably 1.40 to 1.60.

The blending amount of the light diffusing fine particles is preferably 10 parts by weight to 100 parts by weight, more preferably 10 parts by weight to 40 parts by weight, still more preferably 10 parts by weight to 35 parts by weight with respect to 100 parts by weight of the matrix. With such blending amount, the expression (2) can be satisfied. For example, by allowing the light diffusing fine particles having an average particle diameter in the above-mentioned preferred range to be contained in such blending amount, a light diffusing element which is made of a thin film and has very excellent light diffusibility can be obtained. When the light diffusing element is used as a polarizing element on a backlight side, the blended amount of the light diffusing fine particles is preferably 10 parts by weight to 100 parts by weight, more preferably 15 parts by weight to 40 parts by weight with respect to 100 parts by weight of the matrix.

A-4. Manufacturing Method for Light Diffusing Element

A manufacturing method for a light diffusing element according to this embodiment includes the steps of: applying an application liquid, in which a resin component or a precursor thereof and an ultrafine particle component of a matrix, and light diffusing fine particles are dissolved or dispersed in a volatile solvent, onto a base material (defined as Step A); and drying the application liquid applied onto the base material (defined as Step B).

(Step A)

The resin component or precursor thereof, the ultrafine particle component, and the light diffusing fine particles are as described in the sections A-2-1, A-2-2, and A-3, respectively. Typically, the application liquid is a dispersion in which the ultrafine particle component and the light diffusing fine particles are dispersed in the precursor and the volatile solvent. As means for dispersing the ultrafine particle component and the light diffusing fine particles, any suitable means (for example, ultrasound treatment or dispersion treatment with a stirrer) can be adopted.

Any suitable solvent can be adopted as the volatile solvent as long as the solvent can dissolve or uniformly disperse each component described above. Specific examples of the volatile solvent include ethyl acetate, butyl acetate, isopropyl acetate, 2-butanone(methyl ethyl ketone), methyl isobutyl ketone, cyclopentanone, toluene, isopropyl alcohol, n-butanol, cyclopentane, and water.

The application liquid can further contain any suitable additive depending upon the purpose. For example, in order to disperse the ultrafine particle component satisfactorily, a dispersant can be preferably used. Other specific examples of the additive include a UV absorbing agent, a leveling agent, and an antifoaming agent.

The blending amount of each component in the application liquid is as described in the above sections A-2 to A-3. The solid content of the application liquid can be adjusted so as to be preferably about 10% by weight to 70% by weight. With such solid content, an application liquid having a viscosity that facilitates application can be obtained.

Any suitable film can adopted as the base material as long as the effects of the present invention can be provided. Specific examples thereof include a triacetyl cellulose (TAC) film, a polyethylene terephthalate (PET) film, a polypropylene (PP) film, a nylon film, an acrylic film, and a lactone-modified acrylic film. The base material may be subjected to surface modification such as adhesion enhancement treatment, or may include an additive such as a lubricant, an antistat, or a UV absorbing agent, as required. The base material may function as a protective layer in a polarizing plate with a light diffusing element described later.

Any suitable method using a coater can be adopted as a method of applying the application liquid onto the base material. Specific examples of the coater include a bar coater, a reverse coater, a kiss coater, a gravure coater, a die coater, and a comma coater.

(Step B)

As the method of drying the application liquid, any suitable method can be adopted. Specific examples thereof include natural drying, drying by heating, and drying under reduced pressure. Drying by heating is preferred. The heating temperature is, for example, 60° C. to 150° C., and the heating time is, for example, 30 seconds to 5 minutes.

(Step C)

The manufacturing method further includes preferably the step of polymerizing the precursor after the application step (Step C). As the polymerization method, any suitable method can be adopted depending upon the kind of the resin component (thus, the precursor thereof). For example, in the case where the resin component is an ionizing radiation-curable resin, the precursor is polymerized by emitting ionizing radiation. In the case of using UV light as the ionizing radiation, the integrated light quantity is preferably 50 mJ/cm$^2$ to 1,000 mJ/cm$^2$, more preferably 200 mJ/cm$^2$ to 400 mJ/cm$^2$. The transmittance of the ionizing radiation with respect to the light diffusing fine particles is preferably 70% or more, more preferably 80% or more. Further, for example, in the case where the resin component is a thermosetting resin, the precursor is polymerized by heating. The heating temperature and the heating time can be set appropriately depending upon the kind of the resin component. Preferably, the polymerization is conducted by emitting ionizing radiation. The ionizing radiation can cure an applied film while keeping the refractive index modulation region satisfactorily, and hence, a light diffusing element with satisfactory diffusion property can be manufactured. By polymerizing the precursor, the matrix 10 having the refractive index modulation region 30 and the refractive index constant region is formed.

The polymerization step (Step C) may be conducted before the drying step (Step B) or after Step B.

As described above, the light diffusing element as illustrated in FIGS. 1A and 1B is formed on a base material.

It should be appreciated that the manufacturing method for a light diffusing element according to this embodiment can include, in addition to Steps A to C, any suitable steps, treatments and/or operations at any suitable times. The kind of such steps and the like and the time when such steps and the like are conducted can be set appropriately depending upon the purpose.

As described above, the light diffusing element as described in the sections A-1 to A-3 is formed on a base material.

A-5. Another Embodiment

Figure 5:
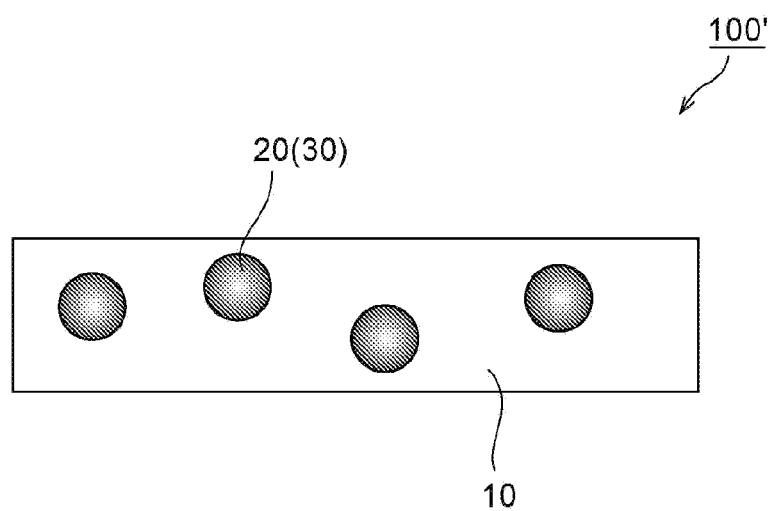
FIG. 5 is a schematic cross-sectional view of a light diffusing element according to another embodiment of the present invention.

FIG. 5 is a schematic cross-sectional view of a light diffusing element according to another embodiment of the present invention. A light diffusing element 100' of FIG. 5 includes a matrix 10 and light diffusing fine particles 20 dispersed in the matrix 10. The light diffusing fine particles 20 are refractive index gradient particles (for example, GRIN fine particles) the refractive index of which changes from a center portion to an outside, and each refractive index gradient portion forms a refractive index modulation region 30. Typically, the refractive index gradient particles are polymer particles, each being formed of a center portion and a surface layer portion covering the center portion. A polymer forming such polymer particles is specifically, for example, a vinyl-based polymer, a (meth)acrylic polymer, or a styrene-based polymer. By selecting a polymer appropriately, a refractive index gradient can be controlled. The refractive index of each of such polymer particles can be changed in stages or continuously by, for example, using a plurality of monomers with different refractive indices, and changing monomer amounts along with the progression of copolymerization of the monomers. Such polymer particles and a manufacturing method therefor are described in detail, for example, in JP 2006-227279 A, and its description is incorporated herein by reference. For example, the matrix 10 can be formed of a resin as described in the section A-2-1 regarding a resin component in an embodiment using the ultrafine particle component. The matrix 10 may or may not contain an ultrafine particle component. In this embodiment, the center portion of the light diffusing fine particle 20 forms the first region, and the matrix 10 forms the second region. In the refractive index modulation region 30, preferably, the refractive index changes substantially continuously.

This embodiment has been described briefly only with respect to a characteristic portion of its structure. The entire characteristics of the light diffusing element according to this embodiment are as described above regarding the embodiment using a matrix including a resin component and an ultrafine particle component.

The light diffusing element of the present invention may be peeled from a base material to be used as a single member or may be used as a light diffusing element with a base material. Alternatively, the light diffusing element may be used as a composite member (for example, a polarizing plate with a light diffusing element) by transferring the light diffusing element from a base material to a polarizing plate or the like, or may be used as a composite member (for example, a polarizing plate with a light diffusing element) by attaching the light diffusing element to a polarizing plate or the like together with a base material. In the case of using the light diffusing element as a composite member (for example, a polarizing plate with a light diffusing element) by attaching the light diffusing element to a polarizing plate or the like together with a base material, the base material can function as a protective layer of the polarizing plate. The light diffusing element of the present invention can be used as, for example, a backlight member (for example, a polarizing element on a backlight side) of a liquid crystal display device or a diffusing member for illumination equipment (for example, an organic EL, LED), besides a diffusing element on a viewer side of a liquid crystal display device adopting the collimated backlight front diffusing system described above. In the case of using the light diffusing element as a polarizing element on a backlight side, the light diffusing element can be formed directly on a reflection type polarizer through use of the reflection type polarizer instead of the base material in the above-mentioned manufacturing method.

The particular embodiments of the present invention have been described hereinbefore. It should be noted that the present invention is not limited to those embodiments, and the present invention includes any other light diffusing element including: a first region having a first refractive index n1; a refractive index modulation region having a substantially spherical shell shape and surrounding the first region; and a second region having a second refractive index n2, positioned on a side of the refractive index modulation region opposite to the first region, in which the light diffusing element satisfies the expressions (1) and (2).

B. Polarizing Plate with Light Diffusing Element

B-1. Entire Construction of Polarizing Plate with Light Diffusing Element

Figure 6:
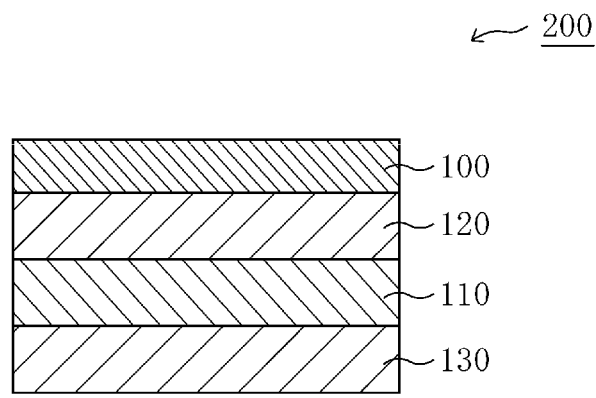
FIG. 6 is a schematic cross-sectional view of a polarizing plate with a light diffusing element according to a preferred embodiment of the present invention.

In one embodiment, a polarizing plate with a light diffusing element of the present invention is placed on a viewer side of a liquid crystal display device. FIG. 6 is a schematic cross-sectional view of a polarizing plate with alight diffusing element according to a preferred embodiment of the present invention. A polarizing plate with a light diffusing element 200 in the figure includes a light diffusing element 100 and a polarizer 110. The light diffusing element 100 is the light diffusing element of the present invention described in the sections A-1 to A-5. The light diffusing element 100 is disposed so as to be placed at a position closest to a viewer side when the polarizing plate with a light diffusing element is placed on the viewer side of the liquid crystal display device. In one embodiment, a low reflective layer or a reflection preventing treatment layer (anti-reflection treatment layer) is placed on the viewer side of the light diffusing element 100 (not shown). In the example illustrated in the figure, the polarizing plate with a light diffusing element 200 includes protective layers 120 and 130 on both sides of the polarizer. The polarizer and the protective layers are attached to each other via any suitable adhesive layer or pressure-sensitive adhesive layer. The light diffusing element is preferably directly formed on one of the protective layers or the polarizer. At least one of the protective layers 120 and 130 may be omitted depending upon the purpose, the construction of the polarizing plate, and the construction of the liquid crystal display device. For example, in the case where a base material used for forming the light diffusing element can function as a protective layer, the protective layer 120 may be omitted. The polarizing plate with a light diffusing element of the present invention can be used particularly suitably as a viewer side polarizing plate in each of a liquid crystal display device adopting a collimated backlight front diffusing system and a liquid crystal display device including a front substrate (for example, a touch panel or a transparent protective plate).

B-2. Polarizer

The term "polarizer" as used herein refers to a member for converting natural light or polarized light into linearly polarized light. Preferably, the polarizer has a function of splitting incident light into two polarized light components perpendicular to each other, transmitting one of the polarized light components, and absorbing, reflecting, and/or scattering the other polarized light component. In one embodiment, the polarizer 110 is an absorption type polarizer. Any appropriate polarizer can be adopted as the absorption type polarizer depending on purposes. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated polyvinyl alcohol film or a dehydrochlorinated polyvinyl chloride film. Of those, a polarizer prepared by adsorbing a dichromatic substance such as iodine on a polyvinyl alcohol-based film and uniaxially stretching the film is particularly preferred because of high polarized dichromaticity. The thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like if necessary, or the polyvinyl alcohol-based film may be immersed in an aqueous solution of potassium iodide or the like. Further, the polyvinyl alcohol-based film may be immersed and washed in water before coloring if necessary.

Washing the polyvinyl alcohol-based film with water not only allows removal of contamination on the surface of the polyvinyl alcohol-based film or washing away of an anti-blocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid, potassium iodide, or the like, or in a water bath.

B-3. Protective Layer

The protective layers 120 and 130 are each formed of any appropriate film which can be used as a protective layer for a polarizing plate. As a material used as a main component of the film, there are specifically exemplified a cellulose-based resin such as triacetylcellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Further, there are exemplified a (meth)acrylic, urethane-based, (meth) acrylic urethane-based, epoxy-based, or silicone-based thermosetting resin or UV-curable resin. Still further, there are exemplified a glassy polymer such as a siloxane-based polymer. In addition, a polymer film described in JP 2001-343529 A (WO 01/37007) may also be used. As the film material, for example, there may be used a resin composition containing a thermoplastic resin having a substituted or unsubstituted imide group on a side chain, and a thermoplastic resin having a substituted or unsubstituted phenyl group and a nitrile group on a side chain. An example thereof is a resin composition containing an alternate copolymer of isobutene and N-methylmaleimide, and an acrylonitrile/styrene copolymer. The polymer film may be an extruded product of the resin composition, for example.

The protective layer (in particular, protective layer placed on the liquid crystal cell side: internal protective layer 130) preferably has optical isotropy. Specifically, a thickness direction retardation Rth(550) of the internal protective layer is preferably in a range of −20 nm to +20 nm, more preferably in a range of −10 nm to +10 nm, particularly preferably in a range of −6 nm to +6 nm, most preferably in a range of −3 nm to +3 nm. An in-plane retardation Re(550) of the internal protective layer is preferably 0 nm or more and 10 nm or less, more preferably 0 nm or more and 6 nm or less, particularly preferably 0 nm or more and 3 nm or less. The film for forming the protective layer having the optical isotropy is described in detail in JP 2008-180961 A and the description is incorporated herein by reference. The thickness of the protective layer is typically 10 μm to 200 μm.

B-4. Manufacturing Method for Polarizing Plate with Light Diffusing Element

Figure 7:
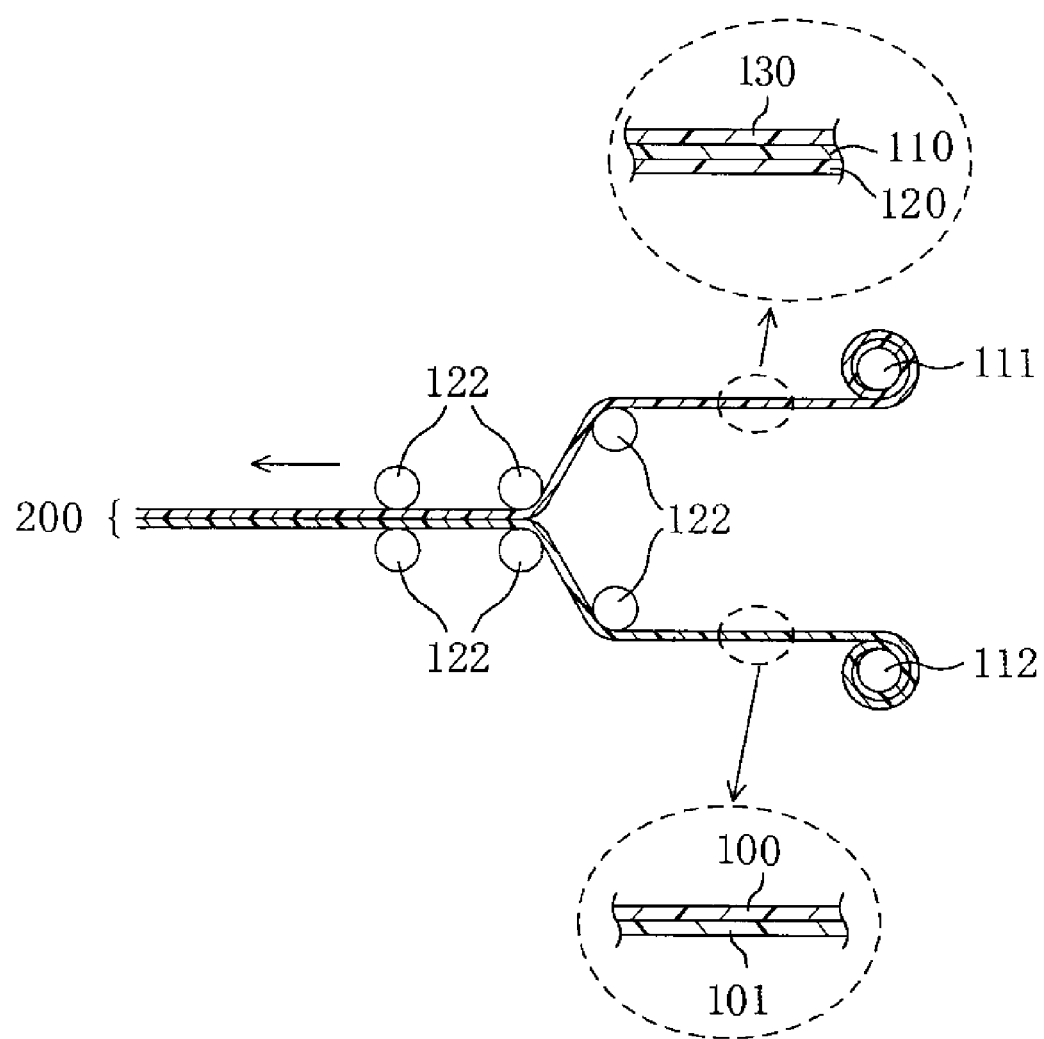
FIG. 7 is a schematic view illustrating an example of a manufacturing method for a polarizing plate with a light diffusing element of the present invention.

Referring to FIG. 7, an example of a manufacturing method for a polarizing plate with a light diffusing element of the present invention is described briefly. In FIG. 7, reference symbols 111 and 112 respectively denote rolls for winding a polarizing plate and a laminate of a light diffusing element/a base material, and 122 denotes conveyance rolls. In the illustrated example, a polarizing plate (protective layer 130/polarizer 110/protective layer 120) and a laminate of a light diffusing element 100/a base material 101 are fed out in an arrow direction and attached to each other while their respective longitudinal directions are aligned. At this time, the polarizing plate and the laminate are attached to each other so that the light diffusing element 100 and the protective layer 120 of the polarizing plate are adjacent to each other. After that, the base material 101 is peeled off if necessary, and thereby, a polarizing plate with a light diffusing element 200 as illustrated in FIG. 6 can be obtained. Although not shown, for example, the polarizing plate (protective layer 130/polarizer 110) and the laminate of the light diffusing element 100/base material 101 can be attached to each other so that the base material 101 and the polarizer 110 are adjacent to each other to produce a polarizing plate with a light diffusing element in which the base material functions as a protective layer. Thus, according to an embodiment of the present invention, so-called roll-to-roll can be adopted, and hence, a polarizing plate with a light diffusing element can be produced at very high production efficiency. Further, the roll-to-roll process can be performed continuously from the production process of the light diffusing element described in the section A-4, and hence, the production efficiency of the polarizing plate with a light diffusing element can be further enhanced by adopting such procedure.

C. Polarizing Element

C-1. Entire Construction of Polarizing Element

Figure 8:
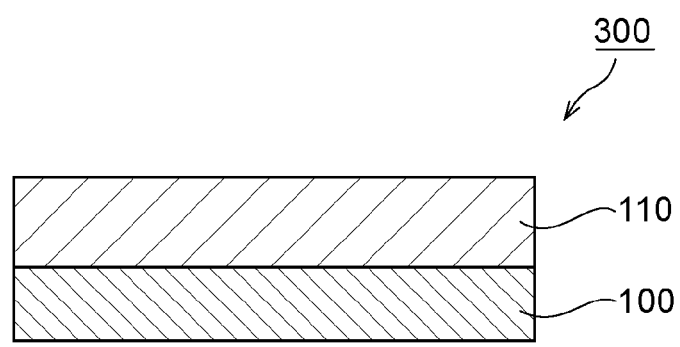
FIG. 8 is a schematic cross-sectional view of a polarizing element according to a preferred embodiment of the present invention.
Figure 9:
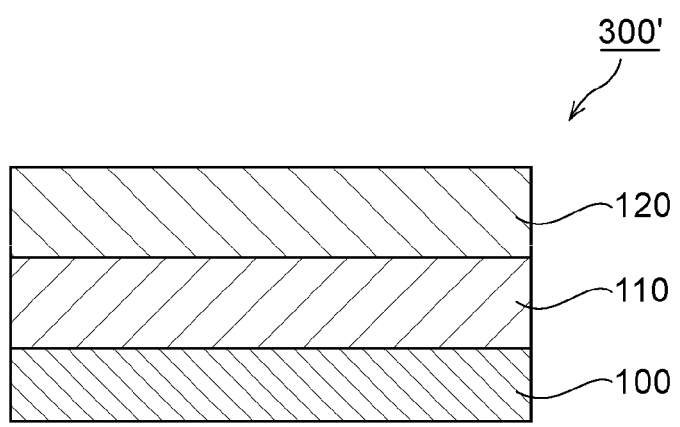
FIG. 9 is a schematic cross-sectional view of a polarizing element according to another preferred embodiment of the present invention.

A polarizing element an embodiment of the present invention includes at least one polarizer and a light diffusing element. FIG. 8 is a schematic cross-sectional view of a polarizing element 300 according to a preferred embodiment of the present invention, and FIG. 9 is a schematic cross-sectional view of a polarizing element 300' according to another preferred embodiment of the present invention. The polarizing element 300 includes a reflection type polarizer 110 and a light diffusing element 100 placed on one side of the reflection type polarizer 110. The polarizing element 300' includes a reflection type polarizer 110, a light diffusing element 100 placed on one side of the reflection type polarizer 110, and an absorption type polarizer 120 placed on the other side of the reflection type polarizer 110. The light diffusing element 100 is the light diffusing element of the present invention described in the sections A-1 to A-5. Preferably, the light diffusing element is formed directly on the reflection type polarizer. Although not shown, the polarizing element of the present embodiment can include other members, besides the polarizers and the light diffusing element. An example of the other members is a protective layer. The thickness of the polarizing element of the present embodiment is typically 20 μm to 300 μm although it varies depending upon the construction.

In a preferred embodiment, the polarizing element is placed on a backlight side of a liquid crystal cell of a liquid crystal display device. By combining the reflection type polarizer and the light diffusing element of the present invention, an optical member having both a brightness enhancing function and a light diffusing function can be provided. Preferably, the polarizing element is disposed so that the light diffusing element is placed on a rear side (backlight side). The light diffusing element of the present invention has very low backscattering and is capable of diffusing light reflected from the reflection type polarizer to the rear side (backlight side) efficiently. As a result, the reflected light from the reflection type polarizer can be used effectively. In the case where the light diffusing element is formed directly on the reflection type polarizer, the reflected light can be further effectively used because an air layer is excluded. Further, in the embodiment of FIG. 9, by combining a reflection type polarizer with a light diffusing element and an absorption type polarizer, the polarizing element can be used as a polarizing element on a rear side (backlight side) of a liquid crystal panel having both a brightness enhancing function and a light diffusing function. Further, by combining the reflection type polarizer with a light diffusing element and the absorption type polarizer (polarizing plate), it is not necessary to consider the independency of the reflection type polarizer as a sheet, and hence a thinner (for example, 25 µm to 100 µm) reflection type polarizer can be used. As a result, this further contributes to reductions in thickness and weight of a liquid crystal display device.

C-2. Reflection Type Polarizer

As the reflection type polarizer, any suitable polarizer can be adopted, as long as it has a function of splitting natural light into linearly polarized light by reflecting/transmitting the light in axis directions perpendicular to each other. Examples thereof include a grid type polarizer (wire grid polarizer), a multi-layered (two or more layered) thin film laminate made of two or more kinds of materials having a refractive index difference, a vapor-deposited multi-layered thin film having a different refractive index to be used for a beam splitter, a birefringent layer multi-layered (two or more layered) thin film laminate made of two or more kinds of materials having a refractive index difference, and one obtained by stretching a two or more layered resin laminate using two or more kinds of resins having a refractive index difference. Specifically, there may be used a polarizer which is obtained by uniaxially stretching a multi-layered laminate in which a material (for example, polyethylene naphthalate, polyethylene terephthalate, or polycarbonate) expressing a retardation by stretching or an acrylic resin (for example, polymethyl methacrylate), and a resin having a small retardation expressing amount (for example, a norbornene-based resin such as "ARTON" manufactured by JSR Corporation) are laminated alternately. As commercially available products, for example, there are given "NIPOCS APCF" (trade name) manufactured by Nitto Denko Corporation and "DBEF" (trade name) manufactured by Sumitomo 3M Limited. The thickness of the reflection type polarizer is typically about 25 µm to 200 µm.

C-3. Absorption Type Polarizer

An example of the absorption type polarizer is the polarizer described in the section B-2. Practically, the absorption type polarizer is incorporated into the polarizing element of the present invention in a construction in which a protective layer is placed at least on one side of the polarizer, that is, as a form of a polarizing plate. An example of the protective layer is the film described in the section B-3.

D. Liquid Crystal Display Device

Figure 10:
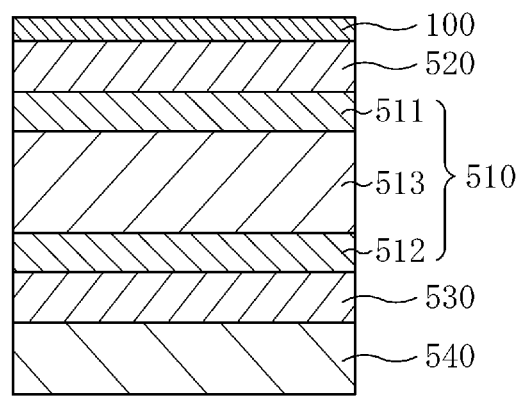
FIG. 10 is a schematic cross-sectional view of a liquid crystal display device according to a preferred embodiment of the present invention.

FIG. 10 is a schematic cross-sectional view of a liquid crystal display device according to a preferred embodiment of the present invention. A liquid crystal display device 500 includes a liquid crystal cell 510, polarizing plates 520 and 530 placed on both sides of the liquid crystal cell, a backlight unit 540 provided on an outer side of the polarizing plate 530, and the light diffusing element 100 provided on an outer side (viewer side) of the polarizing plate 520. The backlight unit 540 is a collimated light source device for emitting collimated light to the liquid crystal cell 510. Any suitable optical compensation plate (retardation plate) can be placed between the liquid crystal cell 510 and the polarizing plates 520 and/or 530 depending upon the purpose. The liquid crystal cell 510 includes a pair of substrates (typically, glass substrates) 511 and 512, and a liquid crystal layer 513 containing a liquid crystal as a display medium, placed between the substrates 511 and 512.

The light diffusing element 100 is the light diffusing element of the present invention described in the sections A-1 to A-5. Alternatively, the polarizing plate with a light diffusing element 200 of the present invention described in the section B may be placed instead of the light diffusing element 100 and the viewer side polarizing plate 520. The light diffusing element transmits and diffuses light (typically, collimated light as described later) having passed through the liquid crystal cell. In the liquid crystal display device of the present embodiment, by using the backlight unit for emitting collimated light and placing the light diffusing element of the present embodiment on a viewer side, a liquid crystal display device which has excellent viewing angle properties and in which gradation inversion is suppressed can be obtained. Further, the effect of enhancing a front contrast ratio by the collimated light source device is remarkably enhanced.

The backlight unit may have any suitable construction capable of emitting the collimated light. For example, the backlight unit includes a light source and a condensing element for collimating light emitted from the light source (both not shown). In this case, any suitable condensing element capable of collimating light emitted from the light source can be adopted as the condensing element. When the light source itself may emit the collimated light, the condensing element may be omitted. The followings are exemplified as a specific construction of the backlight unit (collimated light source device): (1) a construction in which a condensing element having a light shielding layer or a reflective layer provided in a portion except a lens focus, on a flat surface side of a lenticular lens or cannonball type lens is located on a liquid crystal cell side of a light source (for example, cold cathode fluorescent lamp) (for example, JP 2008-262012 A); (2) a construction including a side light type LED light source, a light guide plate therefor, and a variable angle prism which has a convex surface formed on a light guide plate side thereof and is provided on a liquid crystal cell side of the light guide plate (in this construction, anisotropic diffusing element may be further used if necessary; for example, JP 3442247 B2); (3) a construction in which a louver layer having a light absorbing resin and a transparent resin alternately formed in a stripe shape is provided between a backlight and a backlight-side polarizing plate (for example, JP 2007-279424 A); (4) a construction using a cannonball type LED as a light source (for example, JP 06-130255 A); and (5) a construction using a Fresnel lens and, if necessary, a diffusion plate (for example, JP 01-126627 A). The above-mentioned documents describing the detailed constructions are incorporated herein by reference. The construction (5) is described below as an example.

Figure 11A:
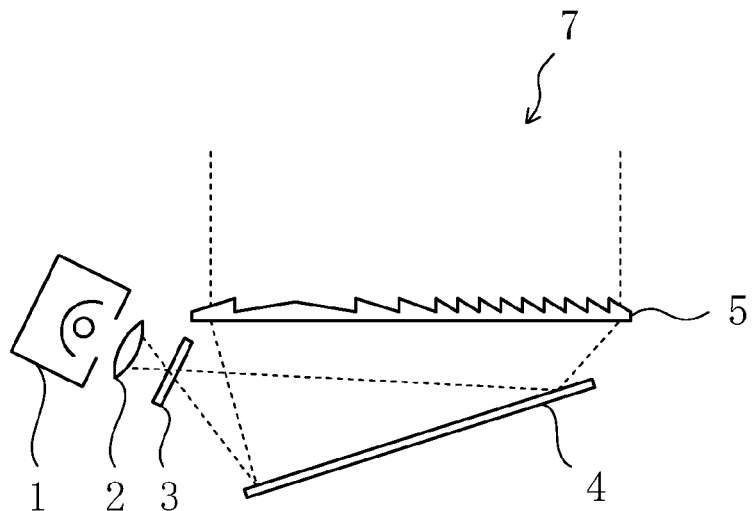
FIG. 11A is a schematic view of a collimated light source device used in the present invention.

FIG. 11A is a schematic view of the collimated light source device of the construction (5). A collimated light source device 7 includes a light source 1, a projection lens 2, a lenticular lens 3, a reflective plate 4, and a Fresnel lens 5. A light beam emitted from the light source 1 passes through the projection lens 2 and the lenticular lens 3, and is reflected from a mirror surface of the reflective plate 4. The reflected light beam passes through the Fresnel lens 5 and is radiated as collimated light.

Figure 11B:
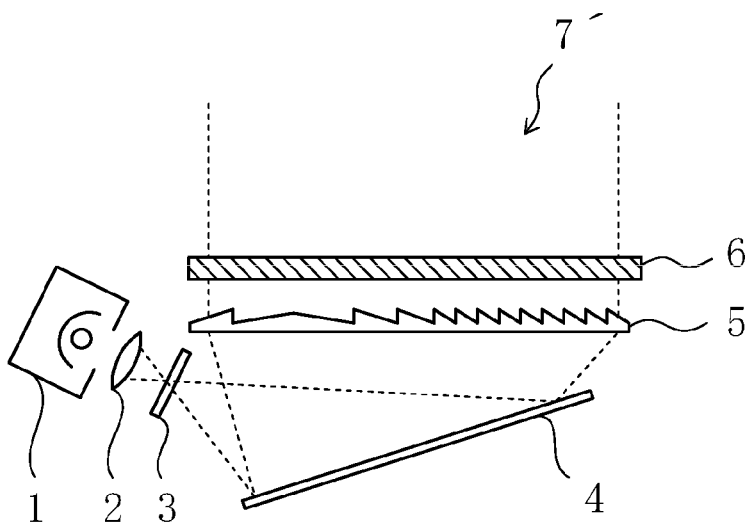
FIG. 11B is a schematic view of a collimated light source device according to another embodiment used in the present invention.

In the collimated light source device in the mode of the construction (5), it is preferred that a diffusion plate for imparting desired diffusibility be placed on a light source side or a liquid crystal cell side of a Fresnel lens of a projection type backlight unit. FIG. 11B illustrates a mode in which a diffusion plate 6 is placed on a liquid crystal cell side of the Fresnel lens 5. The light beam emitted from the light source 1 passes through the projection lens 2 and the lenticular lens 3 and is reflected from a mirror surface of the reflective plate 4. The reflected light beam passes through the Fresnel lens 5 and is radiated as collimated light. The radiated collimated light further passes through the diffusion plate 6 and is diffused and radiated.

Regarding the diffusibility of the diffusion plate, a haze is preferably 2% to 92%, more preferably 30% to 80%. Further, regarding the diffusibility of the diffusion plate, a light diffusion half-value angle is preferably 1° to 30°, more preferably 5° to 20°. It should be noted that the diffusion plate may include a straight-transmitted component, and in this case, it is preferred that the light diffusion half-value angle regarding diffused light excluding the straight-transmitted component be 1° to 30°.

As a diffusion plate having such property, any suitable diffusion plate can be used. Specifically, examples thereof include: a surface uneven diffusion film or internal diffusion film in which a binder containing fine particles is applied onto a transparent substrate film; a phase-separation extruded sheet obtained by blending incompatible resins, followed by extrusion molding; an embossed sheet in which an uneven pattern is formed on the surface with emboss rolls; and an integrated structure of a lens and a diffusion plate, in which one surface or both surfaces of a Fresnel lens are provided with a fine uneven shape by, for example, applying a binder containing fine particles to the surface(s).

Regarding the diffusion performance of the backlight unit 540, a half-value angle is preferably 1° to 40°, more preferably 2° to 30°, still more preferably 2.5° to 20°. When the half-value angle is less than 1°, there is a possibility that glare (glaring) cannot be reduced even when the diffusion performance of the light diffusing element is enhanced. When the half-value angle is more than 40°, oblique light which is not completely compensated in black display is generated, and the oblique light is diffused also to the front surface by the light diffusing element. Therefore, there is a possibility that brightness in black display increases, and a front contrast ratio may be degraded. It should be noted that, in the present invention, the half-value angle refers to a full width at half maximum of an angle at which brightness becomes ½ when an angle is changed from a direction in which brightness becomes maximum, as illustrated in FIG. 12. It should be noted that, even when the half-value angle is less than 1°, if the bottom of diffusion is spread, the same effect as that obtained when the half-value angle is 1° or more may be obtained in some cases. For example, when an average diffusion angle θd expressed by the following expression is 1° or more, glare (glaring) can be reduced by a combination with a light diffusing element performing multiple diffusion.

$$\theta_d = 2 \times \frac{\int_{\phi=0}^{2\pi}\int_{\theta=0}^{\pi/2} \theta \cdot \{L(\phi, \theta)\cos\theta\}\sin\theta d\theta\, d\phi}{\int_{\phi=0}^{2\pi}\int_{\theta=0}^{\pi/2} \{L(\phi, \theta)\cos\theta\}\sin\theta d\theta\, d\phi}$$ [Math. 1]

$L(\phi, 0)$: Backlight brightness

The liquid crystal layer 513 preferably includes liquid crystal molecules that are vertically aligned during black display. Examples of a driving mode of the liquid crystal cell including such liquid crystal layer include a vertical alignment (VA) mode, a multi-domain vertical alignment (MVA) mode, a pattern VA (PVA) mode, a twisted nematic (TN) mode, an electrically controlled birefringence (ECB) mode, and an optically compensated bend (OCB) mode. Further, the driving mode of the liquid crystal cell may be an in-plane switching (IPS) mode.

Figure 13:
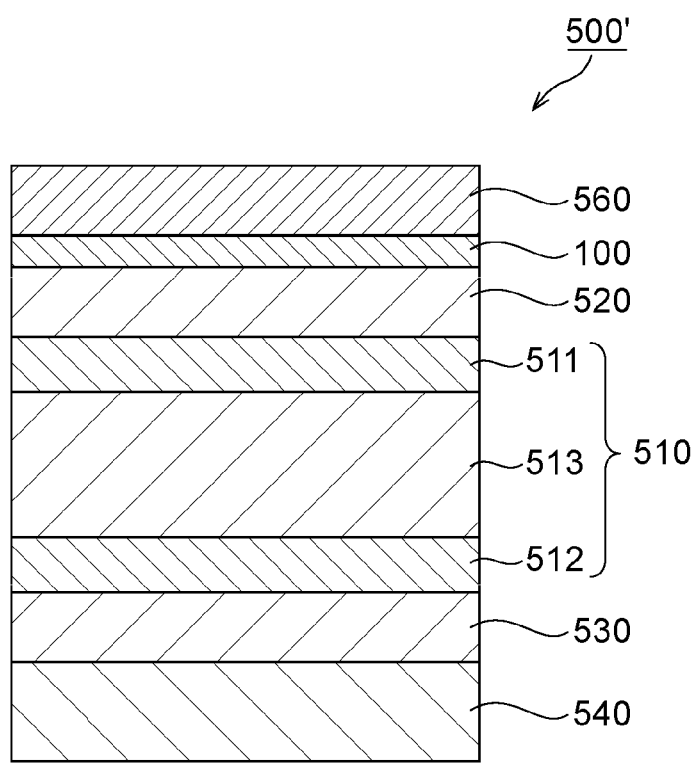
FIG. 13 is a schematic cross-sectional view of a liquid crystal display device according to another embodiment of the present invention.

FIG. 13 is a schematic cross-sectional view of a liquid crystal display device according to another preferred embodiment of the present invention. A liquid crystal display device 500' in the figure further includes a front substrate 560 on a viewer side of the light diffusing element 100 in the liquid crystal display device of FIG. 10. An adhesive layer, a pressure-sensitive adhesive layer, or a double-sided tape (all not shown) are placed between the light diffusing element 100 and the front substrate 560.

As long as the front substrate 560 is a substrate to be provided on a viewer side surface of a liquid crystal display device, any suitable substrate can be used. Preferably, the front substrate is a transparent protective plate for protecting a liquid crystal cell, or a touch panel. As the transparent protective plate, any suitable plate can be used. Specific examples thereof include a glass plate and a plastic substrate. Of those, a plastic substrate such as an acrylic plate is preferred. The touch panel is not particularly limited, and various touch panels such as a resistive film type touch panel, a capacitance type touch panel, and an optical touch panel can be used.

The resistive film type touch panel includes a movable electrode portion, a fixed electrode portion, and a spacer placed between the movable electrode portion and the fixed electrode portion. The movable electrode portion and the fixed electrode portion are each a laminate of a transparent conductive thin film, and a transparent support such as a glass plate or a transparent resin film. In the resistive film type touch panel, the conductive thin film of the movable electrode portion and the conductive thin film of the fixed electrode portion are disposed so as to be opposed to each other with the spacer interposed therebetween. The resistive film type touch panel is disposed so that the movable electrode portion is placed on a viewer side. The movable electrode portion comes into contact with the fixed electrode portion to be electrified when pressed with a finger, a pen, or the like at a time of input, and thereby, the position of the contact portion is detected.

As a material for forming the adhesive layer or the pressure-sensitive adhesive layer to be placed between the light diffusing element 100 and the front substrate 560, any suitable material can be used depending upon the kind and application of an adherend. Preferably, the material for forming the adhesive layer or the pressure-sensitive adhesive layer is a pressure-sensitive adhesive containing an acrylic polymer as a base polymer (also referred to as acrylic pressure-sensitive adhesive). This is because the acrylic pressure-sensitive adhesive is excellent in transparency, adhesion, weather resistance, and heat resistance. The thickness of the acrylic pressure-sensitive adhesive layer can be adjusted appropriately depending upon the quality of material and application of an adherend, and is generally 5 μm to 50 μm.

The thickness of the light diffusing element of the present invention to be used in the liquid crystal display device according to this embodiment is small, and hence, even in the case of using a double-sided tape as attachment means, the influence of an air layer is small, and the effect of reducing parallax can be obtained. As the double-sided tape, any suitable tape can be used as long as it can be used in a liquid crystal display device. As the double-sided tape, a commercially available product may be used. An example of the commercially available product that can be used preferably is "No. 532" (trade name) manufactured by Nitto Denko Corporation. The thickness of the double-sided tape is preferably 10 µm to 100 µm, more preferably 30 µm to 80 µm. By setting the thickness of the double-sided tape in the range, the influence of an air layer to be formed becomes small, and the effect of reducing parallax by using the light diffusing element can be further exhibited. As used herein, the thickness of the double-sided tape refers to the thickness of a pressure-sensitive adhesive after release sheets on both sides are peeled.

The liquid crystal display device of the present embodiment may have a construction optically equivalent to that of the liquid crystal display device of FIG. 13. That is, in the case where the front substrate is a touch panel, the light diffusing element may be placed between a glass plate and a conductive thin film of the touch panel. More specifically, the light diffusing element may be placed between a glass plate and a conductive thin film of the movable electrode portion, or may be placed between a glass plate and a conductive thin film of the fixed electrode portion. Further, the light diffusing element may be placed between a glass plate and a conductive thin film to be placed in an upper portion (viewer side) of the touch panel, or may be placed between a glass plate and a conductive thin film to be placed in a lower portion (liquid crystal cell side) of the touch panel.

Figure 14:
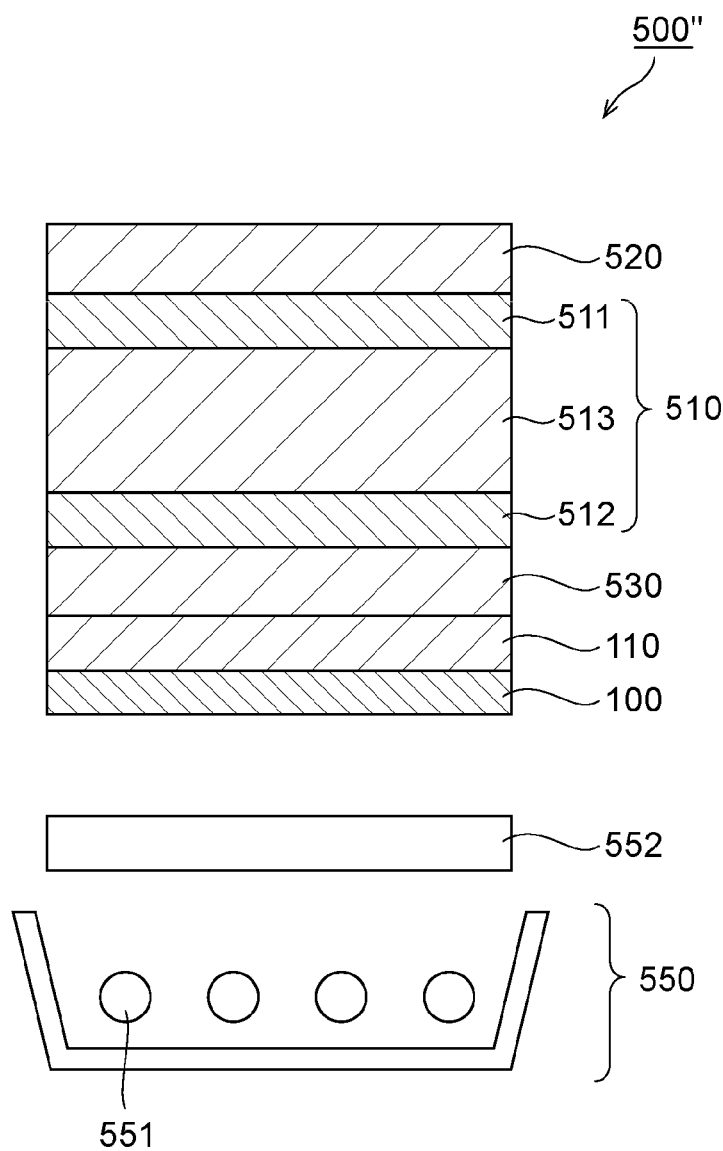
FIG. 14 is a schematic cross-sectional view of a liquid crystal display device according to still another embodiment of the present invention.

A liquid crystal display device according to still another embodiment of the present invention includes a liquid crystal cell, a backlight portion, and the polarizing element of the present invention described in the section C placed between the liquid crystal cell and the backlight portion. FIG. 14 is a schematic cross-sectional view of the liquid crystal display device according to the still another embodiment of the present invention. A liquid crystal display device 500" in the figure includes a liquid crystal cell 510, a lamp house 550 in which light sources 551 are arranged, polarizing plates 520 and 530 arranged on both sides of the liquid crystal cell 510, a reflection type polarizer 110 placed on a backlight side of the polarizing plate 530, a light diffusing element 100 provided on a backlight side of the reflection type polarizer 110, and a diffusion plate 552 placed between the light diffusing element 100 and the lamp house 550. In this embodiment, the lamp house and the diffusion plate constitute a backlight portion. In one embodiment, the reflection type polarizer 110 and the light diffusing element 100 may be integrated to be provided as the polarizing element of the present invention. The light sources 551 (lamp house 550) are arranged so as to be opposed to the liquid crystal cell 510 (direct system). Although not shown, any suitable optical compensation plate (retardation plate) can be placed between the liquid crystal cell 510 and the polarizing plate 520 and/or 530 depending upon the purpose. The liquid crystal cell 510 is as described above.

Although the direct type system has been described, the backlight portion may be of an edge light system. In general, the edge light system further includes a light guide plate and a prism sheet in addition to the construction of the direct type system. The light guide plate is provided so as to oppose to the liquid crystal cell, and the light sources are arranged on a side surface of the light guide plate. Further, the prism sheet is placed on a principal surface of the light guide plate. In general, the direct type system has an advantage in that high brightness can be obtained, and the edge light system has an advantage in that a liquid crystal display device can be rendered thinner.

As the light sources 551, bar-shaped light sources such as a cold cathode fluorescent lamp (CCFL) and an LED are generally used. These light sources emit diffused light, and are arranged in the lamp house 550 at a predetermined interval at a predetermined height in consideration of the brightness and light quantity required for display, desired power consumption, and the like. A ratio of (distance from light source to diffusion plate)/(interval between adjacent light sources) is preferably 0.7 or more. Even with such ratio, a lamp image can be eliminated satisfactorily by using a polarizing element including the light diffusing element. It should be noted that, even in the case where the ratio is less than 0.7, a lamp image can be eliminated, for example, by providing a layer having light diffusibility at an appropriate position (for example, a viewer side of a liquid crystal panel).

For example, in the case where the ratio is more than 2.0, even when the diffusion plate 552 is replaced by a transparent plate (for example, an acrylic plate), a lamp image can be eliminated satisfactorily by including slight light diffusibility of a panel portion as well. As a result, the use efficiency of light can be further enhanced.

In a conventional liquid crystal display device, a diffusion film and a diffusion sheet are retained. In this case, there exists an air layer between the diffusion film and the diffusion sheet, and other optical members. Light is lost easily at an interface with an air layer having a large refractive index difference, and the use efficiency of light decreases. When a plurality of the diffusion films and the diffusion sheets is used, the air layer increases correspondingly, and the use efficiency of light further decreases. On the other hand, the light diffusing element (light diffusing element of the present invention) to be used in the liquid crystal display device according to this embodiment is very thin and can be formed directly on an optical member (polarizer) to eliminate the air layer. As a result, this contributes to enhancement of the use efficiency of light. Further, the light diffusing element of the present invention is very thin, compared with the generally used diffusion film and the diffusion sheet (typically, 100 µm to 300 µm), nevertheless, the light diffusing element has light diffusibility equivalent to or more than that of a plurality of the conventional diffusion films and diffusion sheets. As a result, the liquid crystal display device according to this embodiment can achieve very excellent reductions in thickness and weight. Further, the light diffusing element of the present invention can be formed by a method similar to that for general surface treatment for an optical member, and moreover, a polarizing element to be obtained can be directly attached to a liquid crystal panel (liquid crystal cell). As a result, the liquid crystal display device according to this embodiment can reduce the number of members (in particular, members in the backlight portion), and hence, is very excellent also in productivity and cost.

EXAMPLES

Hereinafter, the present invention is specifically described by way of examples. However, the present invention is not limited by these examples. Evaluation methods in the examples are as follows. In addition, unless otherwise stated, "part(s)" and "%" in the examples are by weight.

(1) Thickness of Light Diffusing Element

The total thickness of a base material and a light diffusing element was measured with a microgauge-type thickness meter (manufactured by Mitutoyo Corporation), and the thickness of the base material was subtracted from the total thickness to calculate the thickness of the light diffusing element.

(2) Thickness of Refractive Index Modulation Region

A laminate of the light diffusing element and the base material obtained in each of the examples and comparative examples was sliced so as to have a thickness of 0.1 µm with a microtome while being cooled with liquid nitrogen to obtain a measurement sample. The state of fine particles in a light diffusing element portion of the measurement sample and the state of an interface between the fine particles and the matrix were observed with a transmission electron microscope (TEM). A portion in which the interface between the fine particles and the matrix was unclear was defined as "refractive index modulation region," and an average thickness L thereof was calculated from the TEM image with image analysis software. More specifically, a largest fine particle in a range observed in a cross-sectional TEM image of a large viewing field (magnification: 300 times) was selected, and the thickness observed in an enlarged image (magnification: 12,000 times) at an interface between the selected fine particle and the matrix was calculated with image analysis software. This analysis was performed at any five places, and an average thickness thereof was defined as the thickness of the refractive index modulation region. In the case where an interface between the fine particle and the matrix was clear, it was recognized that no refractive index modulation region was formed.

(3) Haze and Total Light Transmittance

Measurement was performed with a haze meter ("HN-150" (trade name) manufactured by Murakami Color Research Laboratory Co., Ltd.) in accordance with a method specified in JIS 7136.

(4) Light Diffusion Half-Value Angle

Figure 15:
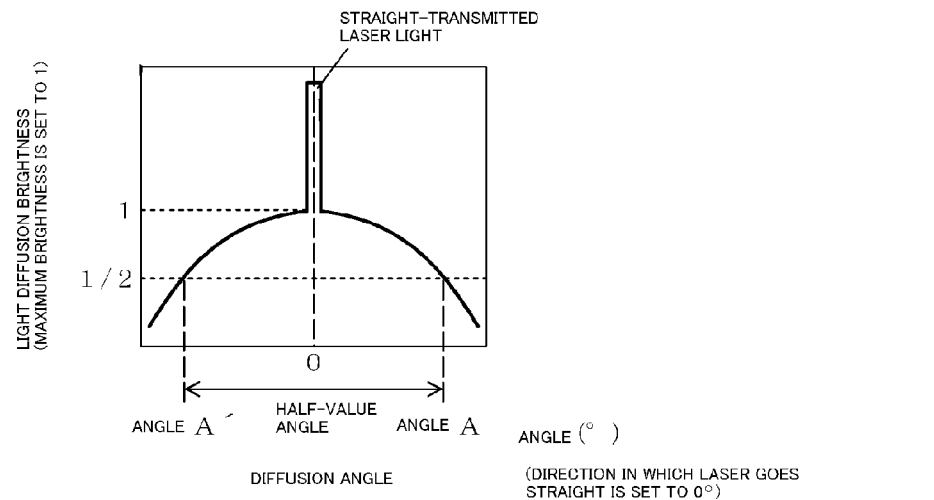
FIG. 15 is a schematic diagram for illustrating a method of calculating a light diffusion half-value angle.

The light diffusing element was irradiated with laser light from its front surface. The diffusion brightness of diffused light at a diffusion angle was measured every 1° by a goniophotometer. As shown in FIG. 15, diffusion angles corresponding to a half of a maximum value of diffusion brightness of light beams other than a straight-transmitted laser beam were measured on both sides of a diffusion profile. A value obtained by adding the angles measured on both sides ("(angle A)+(angle A')" in FIG. 15) was defined as a light diffusion half-value angle.

(5) Backscattering Ratio

The laminate of the light diffusing element and the base material obtained in each of the examples and comparative examples was attached onto a black acrylic plate ("SUMIPEX" (trade name) (trademark), thickness: 2 mm, manufactured by Sumitomo Chemical Co., Ltd.) via a transparent pressure-sensitive adhesive to obtain a measurement sample. The integrated reflectance of the measurement sample was measured with a spectrophotometer ("U4100" (trade name) manufactured by Hitachi Ltd.). On the other hand, a laminate of a base material and a transparent applied layer was produced as a control sample, using an application liquid in which fine particles were removed from the above-mentioned application liquid for a light diffusing element and the integrated reflectance (i.e., surface reflectance) thereof was measured in the same way as described above. The integrated reflectance (surface reflectance) of the control sample was subtracted from the integrated reflectance of the measurement sample to calculate a backscattering ratio of the light diffusing element.

(6) Numbers of Parts by Weight A and B

The number of parts by weight A of a material (light diffusing fine particles in this example) forming the first region and the number of parts by weight B of a material (matrix in this example) forming the second region in the expression (2) were measured as follows: the first region, the second region, and the refractive index modulation region can be discriminated by observation with a transmission electron microscope (TEM). Further, the number of parts by volume of the first region, the second region, and the refractive index modulation region in the light diffusing element can be measured through use of three-dimensional analysis of TEM (3D-TEM). Thus, only any one of the first region and the second region of the light diffusing element was sliced to be obtained as a sample by a SAICAS method, while the light diffusing elements obtained in the examples and comparative examples were being observed with an optical microscope. The sample was subjected to a density gradient tube method using a density gradient tube method density measurement device manufactured by Shibayama Scientific Co., Ltd., whereby the density of the first region or the second region in the sample was measured. Then, the entire light diffusing element was peeled from a base material, and the density thereof was measured in the same way as described above. The number of parts by weight A or B was calculated from the density of the first region or the second region and the density of the entire light diffusing element thus measured, and the number of parts by volume of the first region or the second region measured by the 3D-TEM. It should be noted that the density of the refractive index modulation region was calculated as an average density of the density of the first region and the density of the second region.

(7) Refractive Indices of First Region and Second Region

The sample obtained as described in the above-mentioned evaluation (6) was placed in matching oil and observed, whereby a matching refractive index was measured.

(8) Half-Value Angle of Collimated Light Source Device

Regarding a half-value angle of a collimated light source device, as shown in FIG. 12, a full width at half maximum of an output angle corresponding to half brightness of a maximum value of brightness (generally, brightness at an output angle of 0°) with respect to an output profile was defined as a half-value angle.

(9) Front White Brightness and Front Black Brightness

A fluorescent lamp (200 lx: measurement value by illuminometer IM-5) was placed so that output light entered at an angle of 30° with respect to a direction perpendicular to a liquid crystal display device, and light was applied. As a measurement device, a spectroradiometer ("SR-UL1" (trade name), measurement distance: 500 mm, measurement angle: 1°, manufactured by Topcon Technohouse Corporation) was placed, and brightness in white display in front direction (front white brightness) and brightness in black display in front direction (front black brightness) were measured.

(10) Parallax

A shift from a display portion obtained when a screen of a liquid crystal display device was pointed with a touch pen at a distance of 300 mm in a bright environment was visually observed from a position at 20° with respect to a direction perpendicular to the screen. Symbol "o" indicates that there was no shift from the display portion, and Symbol "x" indicates that there was a shift from the display portion.

(11) Light Diffusion Illuminance

Figure 16:
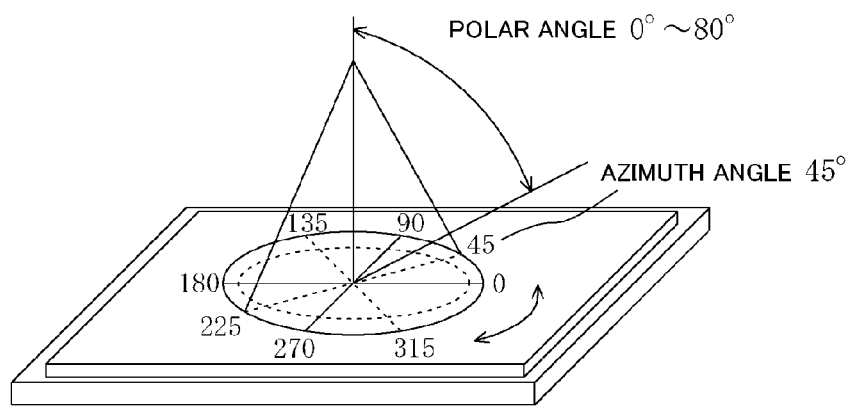
FIG. 16 is a schematic view illustrating an azimuth angle and a polar angle in measurement of light diffusion illuminance.

Light diffusion illuminance is an indicator for the transmission intensity of total light. A conoscope (manufactured by Autronic-Melchers GmbH) was set at a predetermined interval above a polarizing element placed on a backlight, and brightness L (θ, φ) was measured every 1° in all directions (polar angle θ: 0° to 80°, azimuth angle φ: 0° to 360°), as illustrated in FIG. 16. The measured brightness was integrated by the following expression to calculate a light diffusion illuminance (unit: Lx).

$$\text{Light diffusion illuminance} = \int_{\phi=0}^{2\pi} \int_{\theta=0}^{\pi/2} L(\phi,\theta) \cos\theta \cdot \sin\theta \, d\theta \, d\phi \quad \text{[Math. 2]}$$

(12) Lamp Image

A lamp image was observed visually.

(Evaluation Criteria)

⊚: A lamp image was not confirmed in a backlight side polarizing element/backlight construction.

o: Although a lamp image was slightly confirmed in a backlight side polarizing element/backlight construction, a lamp image was not confirmed in a liquid crystal panel/backlight side polarizing element/backlight construction.

x: A lamp image was confirmed in a liquid crystal panel/backlight side polarizing element/backlight construction.

Example 1

Production of Light Diffusing Element

Figure 17A:
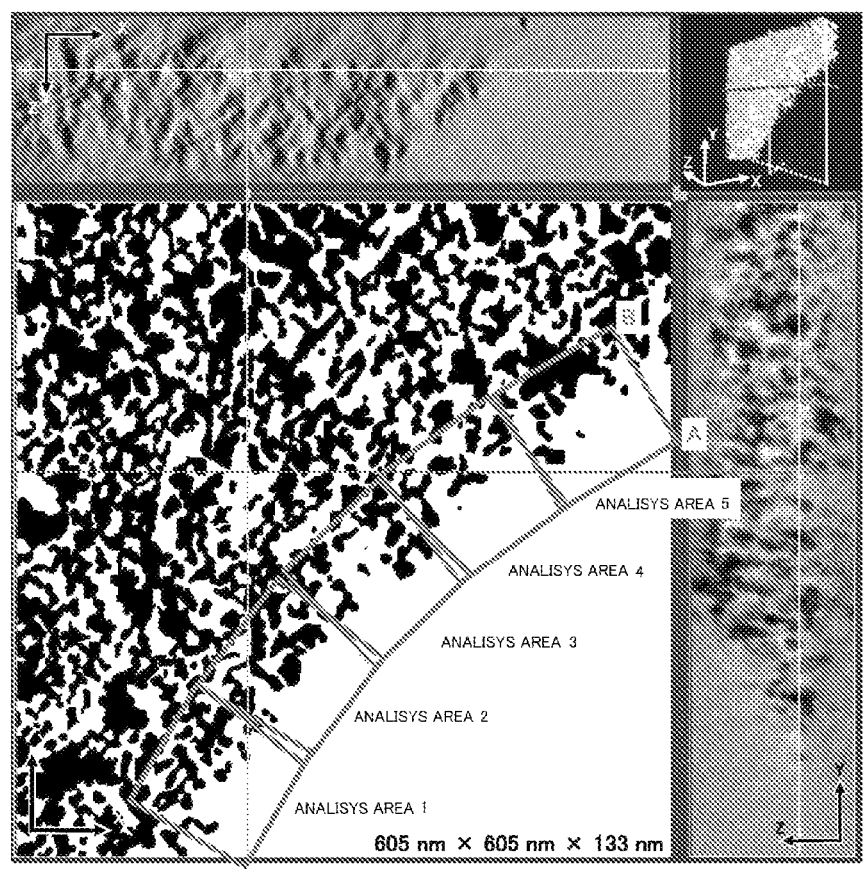
FIG. 17A is a diagram for showing a method of calculating a dispersion concentration (presence ratio) of an ultrafine particle component in the vicinity of an interface between a matrix and a light diffusing fine particle in a light diffusing element of Example 1.
Figure 17B:
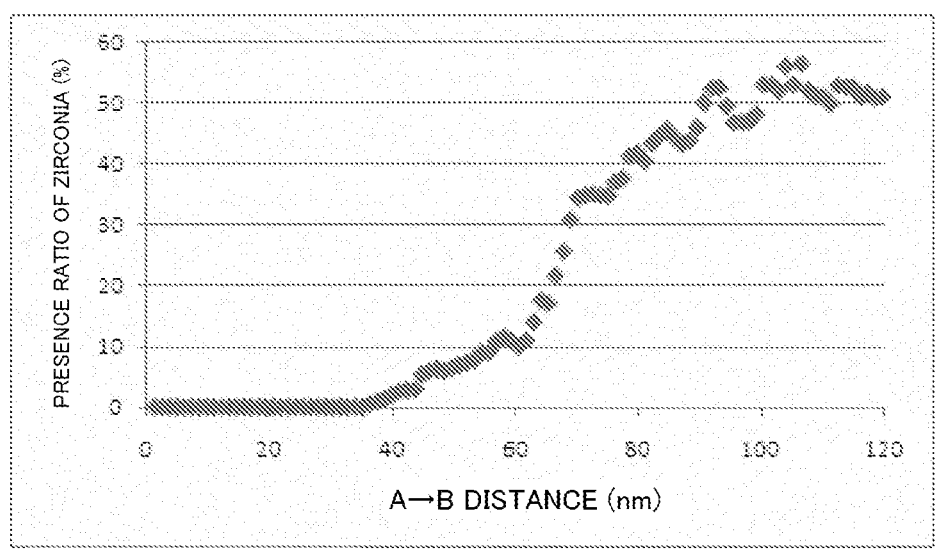
FIG. 17B is a graph showing a relationship between a distance from the surface of the light diffusing fine particle and the dispersion concentration (presence ratio) of the ultrafine particle component in the light diffusing element of Example 1.

To 100 parts of a hard coat resin ("Opstar KZ6661" (trade name) (containing MEK/MIBK) manufactured by JSR Corporation) containing 62% of zirconia nano particles (average primary particle diameter: 10 nm, average particle diameter: 60 nm, refractive index: 2.19) as an ultrafine particle component, 11 parts of a 50% methyl ethyl ketone (MEK) solution of pentaerythritol triacrylate ("Biscoat #300" (trade name), refractive index: 1.52, manufactured by Osaka Organic Chemical Industry Ltd.) as a precursor of a resin component, 0.5 part of a photopolymerization initiator ("Irgacure 907" (trade name), manufactured by BASF Japan Ltd.), 0.5 part of a leveling agent ("GRANDIC PC 4100" (trade name), manufactured by DIC Corporation), and 15 parts of polymethyl methacrylate (PMMA) fine particles ("SAX-102" (trade name), average particle diameter: 2.5 μm, refractive index: 1.495, manufactured by Sekisui Plastics Co., Ltd.) as light diffusing fine particles were added. The mixture was subjected to dispersion treatment with a disperser to prepare an application liquid in which the above-mentioned respective components were dispersed uniformly. The solid content of the application liquid was 55%. Immediately after the application liquid was prepared, the application liquid was applied onto a base material made of a TAC film ("FUJITAC" (trade name), thickness: 40 μm, manufactured by Fuji Photo Film Co., Ltd.) with a bar coater, dried at 100° C. for 1 minute, and irradiated with UV light with an integrated light quantity of 300 mJ/cm² to obtain a light diffusing element with a thickness of 11 μm. It was confirmed by TEM observation that a refractive index modulation region was formed in the vicinity of an interface between a matrix and a light diffusing fine particle. A difference between an average refractive index $n_M$ of the matrix and a refractive index $n_P$ of the light diffusing fine particle in the light diffusing element thus obtained was 0.12 ($n_M > n_P$). The obtained light diffusing element was subjected to the above-mentioned evaluations (1) to (7). Further, a value of $(\Delta n)^2 \times A \times B$ was determined. Table 1 shows the results together with the results of Examples 2 to 10 and Comparative Examples 1 to 4 described later. In addition, a three-dimensional image was reconfigured from a TEM image of a portion in the vicinity of an interface between the matrix and the light diffusing fine particle, and the three-dimensional reconfigured image was binarized. FIG. 17A shows the binarized image. The portion in the vicinity of an interface between the matrix and the light diffusing fine particle of FIG. 17A was divided into five analysis areas. The five analysis areas were each subjected to image processing, and a relationship between a distance from the surface of the light diffusing fine particle and the dispersion concentration (presence ratio) of the ultrafine particle component in each of the analysis areas was calculated. The calculated values of the five analysis areas were averaged, and a relationship between the distance from the surface of the light diffusing fine particle and the dispersion concentration (presence ratio: average of five analysis areas) of the ultrafine particle component was expressed as a graph. FIG. 17B shows the graph. It is understood from this graph that a gradient of dispersion concentration of the ultrafine particle component was formed.

TABLE 1

| | L (nm) | Δn | Δn/L (nm⁻¹) | A (Parts by weight) | B (Parts by weight) | (Δn)²·A·B | L/$r_p$ | Thickness (μm) | Half-value angle (°) | Haze (%) | Backscattering ratio (%) |
|---|---|---|---|---|---|---|---|---|---|---|---|
| Example 1 | 20 | 0.12 | 0.006 | 87 | 13 | 16.2864 | 0.016 | 11 | 60 | 98.60 | 0.39 |
| Example 2 | 50 | 0.12 | 0.0024 | 87 | 13 | 16.2864 | 0.040 | 10 | 60 | 98.90 | 0.38 |
| Example 3 | 100 | 0.12 | 0.0012 | 87 | 13 | 16.2864 | 0.095 | 10 | 62 | 99.02 | 0.48 |
| Example 4 | 200 | 0.12 | 0.0006 | 87 | 13 | 16.2864 | 0.222 | 16 | 47 | 98.32 | 0.19 |
| Example 5 | 50 | 0.12 | 0.0024 | 87 | 13 | 16.2864 | 0.040 | 11 | | 99.45 | |
| Example 6 | 30 | 0.12 | 0.004 | 87 | 13 | 16.2864 | 0.024 | 11 | 65 | 98.76 | |
| Example 7 | 20 | 0.12 | 0.006 | 87 | 13 | 16.2864 | 0.016 | 10 | 60 | 98.76 | |
| Example 8 | 10 | 0.12 | 0.012 | 87 | 13 | 16.2864 | 0.008 | 10 | 59 | 98.82 | 0.29 |
| Example 9 | 50 | 0.12 | 0.0024 | 87 | 13 | 16.2864 | 0.040 | 10 | 41 | 97.01 | 0.21 |
| Example 10 | 50 | 0.08 | 0.016 | 80 | 20 | 10.24 | 0.040 | 9 | 30 | 95.93 | 0.08 |
| Comparative Example 1 | — | 0.14 | — | 83 | 17 | 27.6556 | — | 13 | 58 | 98.91 | 0.69 |
| Comparative Example 2 | — | 0.03 | — | 87 | 13 | 1.0719 | — | 10 | 5 | 21.10 | 0.004 |
| Comparative Example 3 | — | 0.11 | — | 87 | 13 | 13.6851 | — | 10 | 20 | 93.26 | 0.01 |
| Comparative Example 4 | — | 0.15 | — | 87 | 13 | 26.4475 | — | 10 | 30 | 88.99 | 0.15 |

Example 2

Production of Light Diffusing Element

A light diffusing element having a thickness of 10 μm was obtained in the same way as in Example 1 except for using, as light diffusing fine particles, polymethyl methacrylate (PMMA) fine particles ("XX-1341AA" (trade name), average particle diameter: 2.5 μm, refractive index: 1.495, manufactured by Sekisui Plastics Co., Ltd.). The light diffusing element thus obtained was subjected to the same evaluations as those of Example 1. Table 1 above shows the results.

Example 3

Production of Light Diffusing Element

A light diffusing element having a thickness of 10 μm was obtained in the same way as in Example 1 except for using, as light diffusing fine particles, polymethyl methacrylate (PMMA) fine particles ("Art Pearl J4P" (trade name), average particle diameter: 2.1 μm, refractive index: 1.495, manufactured by Negami Chemical Industrial Co., Ltd.). The light diffusing element thus obtained was subjected to the same evaluations as those of Example 1. Table 1 above shows the results.

Example 4

Production of Light Diffusing Element

A light diffusing element having a thickness of 16 μm was obtained in the same way as in Example 1 except for using, as light diffusing fine particles, polymethyl methacrylate (PMMA) fine particles ("MX180TA" (trade name), average particle diameter: 1.8 μm, refractive index: 1.495, manufactured by Soken Chemical & Engineering Co., Ltd.). The light diffusing element thus obtained was subjected to the same evaluations as those of Example 1. Table 1 above shows the results.

Example 5

Production of Light Diffusing Element

A light diffusing element having a thickness of 11 μm was obtained in the same way as in Example 3 except for using 100 parts of a hard coat resin (containing MEK/PGME, manufactured by JSR Corporation) containing 60% of titania nanoparticles (average primary particle diameter: 10 nm, average particle diameter: 60 nm, refractive index: 2.3) as ultrafine particle component. The obtained light diffusing element was subjected to TEM observation to confirm that a refractive index modulation region was formed in the vicinity of an interface between a matrix and a light diffusing fine particle. The obtained light diffusing element was subjected to the same evaluations as those of Example 1. Table 1 above shows the results.

Example 6

Production of Light Diffusing Element

A light diffusing element having a thickness of 11 μm was obtained in the same way as in Example 3 except for using 11 parts of a 50% MEK solution of a hydroxyethyl acrylamide ("HEAA" (trade name), refractive index: 1.52, manufactured by Kohjin Holdings Co., Ltd.) as a precursor of a resin component. The obtained light diffusing element was subjected to TEM observation to confirm that a refractive index modulation region was formed in the vicinity of an interface between a matrix and a light diffusing fine particle. The obtained light diffusing element was subjected to the same evaluations as those of Example 1. Table 1 above shows the results.

Example 7

Production of Light Diffusing Element

A light diffusing element having a thickness of 10 μm was obtained in the same way as in Example 3 except for using 11 parts of a 50% MEK solution of acryloylmorpholine ("ACMO" (trade name), refractive index: 1.52, manufactured by Kohj in Holdings Co., Ltd.) as a precursor of a resin component. The obtained light diffusing element was subjected to TEM observation to confirm that a refractive index modulation region was formed in the vicinity of an interface between a matrix and a light diffusing fine particle. The obtained light diffusing element was subjected to the same evaluations as those of Example 1. Table 1 above shows the results.

Example 8

Production of Light Diffusing Element

A light diffusing element having a thickness of 10 μm was obtained in the same way as in Example 1 except for using 15 parts of fine particles of polymethyl methacrylate (PMMA) provided with a hydrophilic group ("XX-157-AA" (trade name), average particle diameter: 2.5 μm, refractive index: 1.495, manufactured by Sekisui Plastics Co., Ltd.) as light diffusing fine particles. The obtained light diffusing element was subjected to TEM observation to confirm that a refractive index modulation region was formed in the vicinity of an interface between a matrix and a light diffusing fine particle. The obtained light diffusing element was subjected to the same evaluations as those of Example 1. Table 1 above shows the results.

Example 9

Production of Light Diffusing Element

A light diffusing element having a thickness of 10 μm was obtained in the same way as in Example 1 except for using 15 parts of copolymer fine particles of polymethyl methacrylate (PMMA) and polystyrene (PS) ("XX-164-AA" (trade name), average particle diameter: 2.5 μm, refractive index: 1.495, manufactured by Sekisui Plastics Co., Ltd.) as light diffusing fine particles. The obtained light diffusing element was subjected to TEM observation to confirm that a refractive index modulation region was formed in the vicinity of an interface between a matrix and a light diffusing fine particle. The obtained light diffusing element was subjected to the same evaluations as those of Example 1. Table 1 above shows the results.

Example 10

Production of Light Diffusing Element

A light diffusing element having a thickness of 9 μm was obtained in the same way as in Example 1 except that the content of zirconia nanoparticles as an ultrafine particle component in a hard coat resin was set to 25%. The obtained light diffusing element was subjected to TEM observation to confirm that a refractive index modulation region was formed in the vicinity of an interface between a matrix and a light diffusing fine particle. The obtained light diffusing element was subjected to the same evaluations as those of Example 1. Table 1 above shows the results.

Comparative Example 1

A light diffusing element having a construction not containing an ultrafine particle component was produced by the following procedure.

Four parts of silicone resin fine particles ("Tospearl 120" (trade name), average particle diameter: 2.0 μm, refractive index: 1.43, manufactured by Momentive Performance Materials Inc.) were added to a solution in which 20 parts of an acrylonitrile-styrene copolymer (AS) resin ("Stylac AS" (trade name), refractive index: 1.57, manufactured by Asahi Kasei Chemicals Corporation) were dissolved in 100 parts of cyclopentanone (CPN) to prepare an application liquid. The solid content of the application liquid was 19.4%. Immediately after the application liquid was prepared, the application liquid was applied onto a TAC film ("FUJITAC" (trade name), manufactured by Fuji Photo Film Co., Ltd.) with an applicator, and dried at 150° C. for 1 minute to obtain a light diffusing element having a thickness of 13 µm. The obtained light diffusing element was subjected to the same evaluations as those of Example 1. Table 1 above shows the results.

Comparative Example 2

A light diffusing element having a thickness of 10 µm was obtained in the same way as in Example 1 except for using a hard coat resin not containing zirconia nanoparticles as an ultrafine particle component. The obtained light diffusing element was subjected to the same evaluations as those of Example 1. Table 1 above shows the results. Further, it was confirmed by TEM observation that an interface between a matrix and a light diffusing fine particle was clear, and no refractive index modulation region was formed.

Comparative Example 3

A light diffusing element having a thickness of 10 µm was obtained in the same way as in Example 1 except for adding 15 parts of polystyrene (PS) fine particles ("SX-350H" (trade name), average particle diameter: 3.5 µm, refractive index: 1.595, manufactured by Soken Chemical & Engineering Co., Ltd.) as light diffusing fine particles to 100 parts of a hard coat resin ("Z7540" (trade name), manufactured by JSR Corporation) containing 30% of silica nanoparticles (average primary particle diameter: 10 nm, average particle diameter: 40 nm, refractive index: 1.49) as an ultrafine particle component. The obtained light diffusing element was subjected to the same evaluations as those of Example 1. Table 1 above shows the results.

Comparative Example 4

A light diffusing element having a thickness of 10 µm was obtained in the same way as in Example 1 except for using 15 parts of methyl-modified silica fine particles ("Seahoster KE-250" (trade name), manufactured by Nippon Shokubai Co., Ltd.) as light diffusing fine particles. The obtained light diffusing element was subjected to the same evaluations as those of Example 1. Table 1 above shows the results.

Example 11

Production of Liquid Crystal Display Device

A liquid crystal cell was removed from a commercially available liquid crystal TV ("KDL20J3000" (trade name), BRAVIA (20-inch), manufactured by Sony Corporation) having a liquid crystal cell of a multi-domain type VA mode. Commercially available polarizing plates ("NPF-SEG1423DU" (trade name), manufactured by Nitto Denko Corporation) were attached to both sides of the liquid crystal cell so that absorption axes of the respective polarizers were perpendicular to each other. More specifically, the polarizing plates were attached to the liquid crystal cell so that the absorption axis direction of the polarizer of the backlight side polarizing plate became a vertical direction (90° with respect to the longitudinal direction of the liquid crystal panel) and the absorption axis direction of the polarizer of the viewer side polarizing plate became a horizontal direction (0° with respect to the longitudinal direction of the liquid crystal panel). Further, the light diffusing element of Example 1 was transferred from the base material to be attached to the outer side of the viewer side polarizing plate to produce a liquid crystal panel.

Meanwhile, a pattern of a lenticular lens was transferred to one surface of a PMMA sheet by melt thermal transfer, using a transfer roll. Aluminum was pattern deposited to a surface (smooth surface) on a side opposite to the surface on which the lens pattern was formed so that light passed through only a focal point of the lens, and thus, a reflective layer having an area ratio of an opening of 7% (area ratio of a reflection portion of 93%) was formed. Thus, a light collecting element was produced. As a light source of a backlight, a cold cathode fluorescent lamp (CCFL of BRAVIA20J, manufactured by Sony Corporation) was used, and the light collecting element was attached to the light source to produce a collimated light source device (backlight unit) emitting collimated light.

The above-mentioned backlight unit was incorporated into the above-mentioned liquid crystal panel to produce a liquid crystal display device of a collimated backlight front diffusing system. A white display and a black display were performed in a dark place in the obtained liquid crystal display device, and the display states were visually observed. As a result, the liquid crystal display device exhibited satisfactory display characteristics in which a black display was dark in a bright place, and brightness of a white display in a dark place was high, when seen from an oblique direction.

Comparative Example 5

A liquid crystal display device was produced in the same way as in Example 11 except for using the light diffusing element of Comparative Example 1. A white display and a black display were performed in a dark place in the obtained liquid crystal display device, and the display states were visually observed. As a result, although brightness of a white display in a dark place was high, a black display in a bright place looked whitish when seen from an oblique direction.

Comparative Example 6

A liquid crystal display device was produced in the same way as in Example 11 except for using the light diffusing element of Comparative Example 2. A white display and a black display were performed in a dark place in the obtained liquid crystal display device, and the display states were visually observed. As a result, although brightness of a white display in a dark place was high, a black display in a bright place looked whitish when seen from an oblique direction.

Example 12

Production of Liquid Crystal Display Device

A liquid crystal display device was produced in the same way as in Example 11 except for using the light diffusing element of Example 2 in place of the light diffusing element of Example 1. In the obtained liquid crystal display device, a white display and a black display were performed in a dark place, and the display states were visually observed. As a result, the liquid crystal display device exhibited satisfactory display characteristics in which a black display was dark in a bright place, and brightness of a white display in a dark place was high, when seen from an oblique direction.

Example 13

Production of Liquid Crystal Display Device

A liquid crystal display device was produced in the same way as in Example 11 except for using the light diffusing element of Example 3 in place of the light diffusing element of Example 1. In the obtained liquid crystal display device, a white display and a black display were performed in a dark place, and the display states were visually observed. As a result, the liquid crystal display device exhibited satisfactory display characteristics in which a black display was dark in a bright place, and brightness of a white display in a dark place was high, when seen from an oblique direction.

Example 14

Relationship Between Average Refractive Index of Matrix and Refractive Index of Light Diffusing Fine Particle, and Backscattering Scattering intensity of one light diffusing fine particle was simulated under various conditions through use of electromagnetic field analysis software (Microwave Studio, manufactured by CST Corporation) based on a finite integration technique (FIT). The wavelength was set to 550 nm. It should be noted that the FIT method involves discretizing Maxwell's equations in an integral form and analyzing the equations with a time domain. Hereinafter, a similar simulation was performed up to Example 17.

In this example, the simulation was performed for light diffusing fine particle/matrix systems which exhibited refractive index changes as illustrated respectively in FIGS. 18(*a*) and 18(*b*). It should be noted that, in FIG. 18(*a*), n represents a refractive index and d represents a distance (μm) from the center of the light diffusing fine particle (hereinafter the same applies unless otherwise specified). FIG. 18(*c*) shows a comparison in backscattering ratio between the system of 7-1 of FIG. 18(*a*) and the system of 7-2 of FIG. 18(*b*). As is apparent from FIG. 18(*c*), the backscattering ratio becomes small when the relationship of $n_M > n_P$ is satisfied. It should be noted that the system having a gap in a change in refractive index exhibited a remarkably large backscattering ratio irrespective of the magnitude relation between $n_M$ and $n_P$, compared with those of FIG. 18(*c*).

Example 15

Relationship Between Average Refractive Index of Matrix and Refractive Index of Light Diffusing Fine Particle, and Diffusibility and Backscattering The simulation described in Example 14 was performed for each of light diffusing fine particle/matrix systems 8-1 to 8-5 exhibiting refractive index changes as shown in FIG. 19(*a*). FIG. 19(*b*) shows a relationship between scattering intensity (corresponding to diffusibility) per unit volume and a backscattering ratio regarding each of the systems. As is apparent from FIG. 19(*b*), no significant difference was recognized among the systems 8-1 to 8-5. It is understood from these results that, if the relationship of $n_M > n_P$ is satisfied, a gap of a refractive index in a boundary between a light diffusing fine particle and a refractive index modulation region, and a gap of a refractive index in a boundary between a refractive index modulation region and a matrix can each be permitted within a predetermined range (for example, Δn is 0.05 or less).

Example 16

Relationship Between Average Refractive Index of Matrix and Refractive Index of Light Diffusing Fine Particle, and Diffusibility and Backscattering The simulation described in Example 14 was performed for each of light diffusing fine particle/matrix systems 9-1 to 9-3 exhibiting refractive index changes as shown in FIG. 20(*a*) and light diffusing fine particle/matrix systems 9-4 to 9-6 exhibiting refractive index changes as shown in FIG. 21(*a*). FIG. 20(*b*) shows a relationship between scattering intensity (corresponding to diffusibility) per unit volume and a backscattering ratio regarding each of the systems 9-1 to 9-3, and FIG. 21(*b*) shows a relationship between scattering intensity (corresponding to diffusibility) per unit volume and a backscattering ratio regarding each of the systems 9-4 to 9-6. It is understood from FIG. 20(*b*) that, if $n_M < n_P$, the backscattering ratio becomes remarkably large when there is a gap of a refractive index in a boundary between a refractive index modulation region and a matrix. On the other hand, it is understood from FIG. 21(*b*) that, if the relationship of $n_M > n_P$ is satisfied, the backscattering ratio changes less even when there is a gap of a refractive index in a boundary between a light diffusing fine particle and a refractive index modulation region and/or a boundary between a refractive index modulation region and a matrix. These results are also matched with the results of FIG. 19(*b*).

Example 17

Relationship Between Δn/L and Diffusibility

Figure 22:
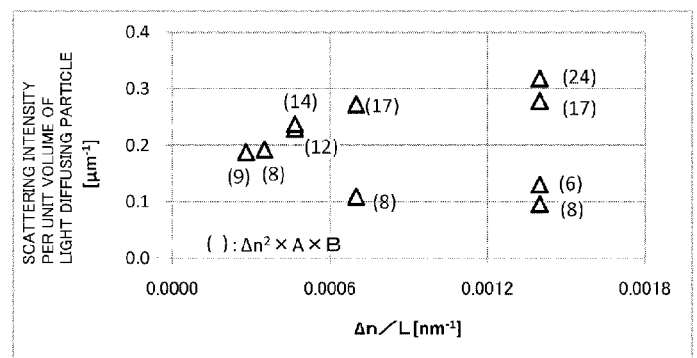
FIG. 22 is a graph of a simulation showing a relationship between Δn/L and diffusibility.
Figure 23:
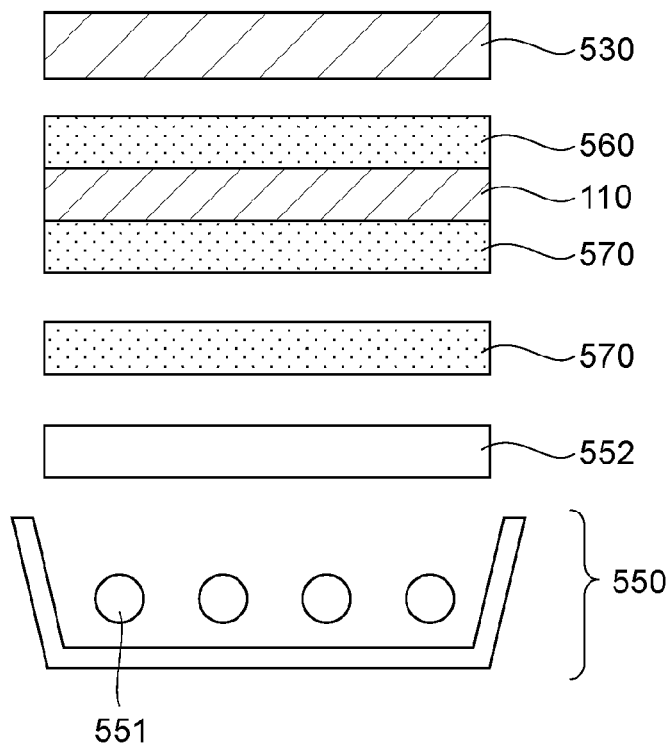
FIG. 23 is a schematic cross-sectional view illustrating a basic structure of a general direct type backlight unit.

The simulation described in Example 14 was performed for various Δn/L systems. Table 2 and FIG. 22 show the results. In Calculation Examples 1 to 5, calculation was performed with $r_P + L$ being set to be constant and L being decreased. In Calculation Examples 4 and 5 in which as L decreased, $\Delta n^2 \times A \times B$ increased, Δn/L reached 0.0006 or more and $\Delta n^2 \times A \times B$ reached 10 or more, high light diffusing intensity was calculated. Next, in Calculation Examples 5 to 7, calculation was performed with $r_P$ being fixed and L being increased. Only in Calculation Example 5 in which as L increased, Δn/L and $\Delta n^2 \times A \times B$ decreased, and Δn/L was 0.0006 or more and $\Delta n^2 \times A \times B$ was 10 or more, the calculation yielded high light diffusing intensity. Further, in Calculation Examples 8, 9, and 11, calculation was performed in a case where $\Delta n^2 \times A \times B$ became less than 10 (due to small A or Δn) while a steep refractive index modulation gradient Δn/L was held, and as a result, the calculation did not yield high light diffusing intensity. In Calculation Example 10, calculation was performed under the condition that Δn was decreased compared with Calculation Example 5, and Δn was decreased to such a degree that $\Delta n^2 \times A \times B$ became 10 or more, and as a result, the calculation yielded high light diffusing intensity.

TABLE 2

| | Δn | rP [μm] | L [μm] | Number of parts by weight A | Number of parts by weight B | Refractive index modulation region (parts by weight) | Δn/L (nm$^{-1}$) | $\Delta n^2 \times A \times B$ | L/rP | Scattering intensity per unit volume of light diffusing element [μm$^{-1}$] |
|---|---|---|---|---|---|---|---|---|---|---|
| Calculation Example 1 | 0.14 | 0 | 1.1 | 0 | 80 | 20 | 0.0001 | 0 | 100 | 0.04 |

TABLE 2-continued

|  | Δn | rP [μm] | L [μm] | Number of parts by weight A | Number of parts by weight B | Refractive index modulation region (parts by weight) | Δn/L (nm⁻¹) | Δn² × A × B | L/rP | Scattering intensity per unit volume of light diffusing element [μm⁻¹] |
|---|---|---|---|---|---|---|---|---|---|---|
| Calculation Example 2 | 0.14 | 0.7 | 0.4 | 5.2 | 80 | 14.8 | 0.0004 | 8 | 0.57 | 0.19 |
| Calculation Example 3 | 0.14 | 0.8 | 0.3 | 7.7 | 80 | 12.3 | 0.0005 | 12 | 0.38 | 0.23 |
| Calculation Example 4 | 0.14 | 0.9 | 0.2 | 11.0 | 80 | 9.0 | 0.0007 | 17 | 0.22 | 0.27 |
| Calculation Example 5 | 0.14 | 1 | 0.1 | 15.0 | 80 | 5.0 | 0.0014 | 24 | 0.10 | 0.32 |
| Calculation Example 6 | 0.14 | 1 | 0.3 | 9.1 | 80 | 10.9 | 0.0005 | 14 | 0.30 | 0.24 |
| Calculation Example 7 | 0.14 | 1 | 0.5 | 5.9 | 80 | 14.1 | 0.0003 | 9 | 0.50 | 0.19 |
| Calculation Example 8 | 0.14 | 0.9 | 0.2 | 4.4 | 92 | 3.6 | 0.0007 | 8 | 0.22 | 0.11 |
| Calculation Example 9 | 0.14 | 1 | 0.1 | 4.5 | 94 | 1.5 | 0.0014 | 8 | 0.10 | 0.10 |
| Calculation Example 10 | 0.12 | 1 | 0.1 | 15.0 | 80 | 5.0 | 0.0014 | 17 | 0.10 | 0.28 |
| Calculation Example 11 | 0.07 | 1 | 0.1 | 15.0 | 80 | 6.0 | 0.0014 | 6 | 0.10 | 0.13 |

<Evaluation>

As is apparent from Table 1, each of the light diffusing elements of Examples in which a refractive index modulation region was formed, and Δn/L and (Δn)²×A×B was optimized in a predetermined range had a high haze and a low backscattering ratio. Further, each of the light diffusing elements of Examples were very thin, having a thickness of at most 16 μm. Further, each of the light diffusing elements of Examples exhibited very excellent display characteristics, when used as a front diffusing element of a liquid crystal display device of a collimated backlight front diffusing system. Further, each of the light diffusing elements of Examples of the present invention can be produced without using a cumbersome process. On the other hand, the light diffusing element of Comparative Example 1 in which no refractive index modulation region was formed had a high backscattering ratio while exhibiting a high haze, and the light diffusing element of Comparative Example 2 had a very insufficient haze while exhibiting a low backscattering ratio. The light diffusing elements of Comparative Examples were each recognized to have a problem in that a black display became whitish in a bright place when used as a front diffusing element of a liquid crystal display device of a collimated backlight front diffusing system. As described above, according to the present invention, a light diffusing element made of a thin film having a high haze value and strong light diffusibility, and having suppressed backscattering can be obtained.

Reference Example 1

Production of Light Diffusing Element with Reflection Preventing Element

A siloxane oligomer ("COLCOAT N103" (trade name), solid content: 2% by weight, manufactured by Colcoat Co., Ltd.) having a number average molecular weight of 500 to 10,000 in terms of ethylene glycol was prepared. The measured number average molecular weight of the siloxane oligomer was 950 in terms of ethylene glycol. Further, a fluorine compound ("Opster JTA105" (trade name), solid content: 5% by weight, manufactured by JSR Corporation) having a number average molecular weight of 5,000 or more in terms of polystyrene and having a fluoroalkyl structure and a polysiloxane structure was prepared and measured for a number average molecular weight similarly. The measured number average molecular weight of the fluorine compound was 8,000 in terms of polystyrene.

50 parts of the siloxane oligomer, 100 parts of the fluorine compound, 1 part of a curing agent ("JTA 105A" (trade name), solid content: 5% by weight, manufactured by JSR Corporation), and 160.5 parts of MEK were mixed to prepare a material for forming a reflection preventing layer. The material for forming a reflection preventing layer thus obtained was applied onto the light diffusing element produced in Example 1 with a bar coater so as to have the same width. The light diffusing element having the material for forming a reflection preventing layer applied thereto was dried and cured by heating at 120° C. for 3 minutes to form a light diffusing element (thickness: 11 μm, haze: 98%, light diffusion half-value angle: 62°) with a reflection preventing layer (low refractive index layer, thickness: 0.11 μm, refractive index: 1.42). The reflection preventing layer was thin, and hence, the thickness of the light diffusing element with a reflection preventing layer was substantially the same as that of the light diffusing element of Example 1.

Reference Example 2

Production of Collimated Light Source Device

A collimated light source device having a construction illustrated in FIG. 11A was produced as follows. A projection lens, a lenticular lens (spot-shaped slit), an aluminum mirror surface reflective plate, and an acrylic Fresnel lens (diagonal size: 20 inches, focal length: f=40 cm) were placed on a front surface of a metal halide lamp light source of 100 W to produce a collimated light source device 1. The collimated light source device 1 had a half-value angle of 2.5°.

Reference Example 3

Production of Collimated Light Source Device

A collimated light source device 2 was produced in the same way as in Reference Example 2 except for using a surface uneven light diffusing sheet having a haze of 70% and a light diffusion half-value angle of 15°. The collimated light source device 2 had a half-value angle of 15°.

Reference Example 4

Production of Light Diffusing Pressure-Sensitive Adhesive Layer

To 100 parts by weight of an application liquid of an acrylic pressure-sensitive adhesive (solid content: 12% by weight), 3.8 parts by weight of silicone fine particles ("Tospearl 140" (trade name), particle diameter: 4.2 μm, manufactured by Momentive Performance Materials Inc.) were added, and the mixture was stirred for 1 hour to obtain an application liquid for forming a light diffusing pressure-sensitive adhesive layer. The application liquid for forming a light diffusing pressure-sensitive adhesive layer was applied onto a PET film (separator) which had been subjected to light peeling treatment, and the resultant was dried at 120° C. to obtain an applied layer having a thickness of 25 μm. Application and drying steps were repeated three times to produce a light diffusing pressure-sensitive adhesive layer (thickness: 75 μm) in which three applied layers were laminated. This light diffusing pressure-sensitive adhesive layer had a haze of 97%, a total light transmittance of 89%, and a light diffusion half-value angle of 31°.

Example 18

Production of Polarizing Plate with Light Diffusing Element and Liquid Crystal Display Device A polymer film ("VF-PE#6000" (trade name), manufactured by Kuraray Co., Ltd.) having a thickness of 60 μm and containing a polyvinyl alcohol-based resin as a main component was subjected to swelling, dyeing, cross-linking, and water-washing steps under normal conditions while being provided with a tension in a film longitudinal direction and stretched so that a final stretching ratio became 6.2 times with respect to the original length of the film. The stretched film was dried in an air circulation type dry oven at 40° C. for 1 minute to produce a polarizer (thickness: 24 μm).

A polymer film ("KC4UY" (trade name), manufactured by Konica Minolta Holdings, Inc.) having a thickness of 40 μm and containing a cellulose-based resin was attached to one surface of the resultant polarizer via a water-soluble adhesive ("GOHSEFIMER Z200" (trade name), manufactured by The Nippon Synthetic Chemical Industry Co., Ltd.) containing a polyvinyl alcohol-based resin as a main component. Then, the light diffusing element obtained in Example 1 was transferred and attached from the base material to the other surface of the polarizer via 5 μm of a water-soluble adhesive ("GOHSEFIMER Z200" (trade name), manufactured by The Nippon Synthetic Chemical Industry Co., Ltd.) containing a polyvinyl alcohol-based resin as a main component. After that, 20 μm of an acrylic pressure-sensitive adhesive were applied onto a surface of the polymer film containing a cellulose-based resin to obtain a polarizing plate with a light diffusing element.

The polarizing plate with a light diffusing element thus obtained was attached to a twisted nematic (TN) liquid crystal cell via the acrylic pressure-sensitive adhesive applied onto the surface of the polymer film. Then, an acrylic plate (transparent acrylic plate used in a mobile phone "W43H" (trade name) manufactured by Hitachi Ltd., thickness: 485 μm) was brought into close contact with and attached as a front substrate to a surface of the light diffusing element, not facing the polarizer, via 5 μm of an acrylic pressure-sensitive adhesive. Then, a commercially available polarizing plate ("NWF-LN-SEG" (trade name), manufactured by Nitto Denko Corporation) was attached to a surface of the liquid crystal cell to which the polarizing plate with a light diffusing element was not attached. The collimated light source device 1 was placed on an outer side of the polarizing plate to produce a liquid crystal display device having a construction shown in Table 3. Table 7 shows characteristics of the obtained liquid crystal display device.

TABLE 3

| Examples 18, 19, and 20 | Comparative Examples 7 and 8 |
|---|---|
| Acrylic plate | Acrylic plate |
| Pressure-sensitive adhesive layer | |
| Light diffusing element | Light diffusing pressure-sensitive adhesive layer |
| Polarizing plate | Polarizing plate |
| Liquid crystal cell | Liquid crystal cell |
| Polarizing plate | Polarizing plate |
| Collimated light source device | Collimated light source device |

Example 19

Production of Liquid Crystal Display Device

A liquid crystal display device having a construction shown in Table 3 was produced in the same way as in Example 18 except for using the light diffusing element with a reflection preventing layer obtained in Reference Example 1 instead of the light diffusing element of Example 1. Table 7 shows characteristics of the obtained liquid crystal display device.

Example 20

Production of Liquid Crystal Display Device

A liquid crystal display device having a construction shown in Table 3 was produced in the same way as in Example 18 except for using the collimated light source device 2 instead of the collimated light source device 1. Table 7 shows characteristics of the obtained liquid crystal display device.

Comparative Example 7

The light diffusing pressure-sensitive adhesive layer obtained in Reference Example 4 was used instead of the light diffusing element, and the light diffusing pressure-sensitive adhesive layer and a polarizer were attached so as to be brought into close contact with each other to obtain a polarizing plate with a light diffusing pressure-sensitive adhesive layer. A liquid crystal display device having a construction shown in Table 3 was produced in the same way as in Example 18 except for using the polarizing plate with a light diffusing pressure-sensitive adhesive layer. Table 7 shows characteristics of the obtained liquid crystal display device.

Comparative Example 8

The light diffusing pressure-sensitive adhesive layer obtained in Reference Example 4 was used instead of the light diffusing element, and the light diffusing pressure-sensitive adhesive layer and a polarizer were attached so as to be brought into close contact with each other to obtain a polarizing plate with a light diffusing pressure-sensitive adhesive layer. A liquid crystal display device having a construction shown in Table 3 was produced in the same way as in Example 20 except for using the polarizing plate with a light diffusing pressure-sensitive adhesive layer. Table 7 shows characteristics of the obtained liquid crystal display device.

Example 21

Production of Liquid Crystal Display Device

A liquid crystal display device having a construction shown in Table 4 was produced in the same way as in Example 18 except for using a touch panel (resistive film type touch panel used in a NOTE-PC "ShieldPRO" (trade name) manufactured by NEC Corporation, thickness: 945 μm) instead of the acrylic plate as a front substrate. Table 7 shows characteristics of the obtained liquid crystal display device.

TABLE 4

| Examples 21 and 22 | | Comparative example 9 | |
|---|---|---|---|
| Glass plate | Touch panel | Glass plate | Touch panel |
| Conductive thin film | | Conductive thin film | |
| Spacer | | Spacer | |
| Conductive thin film | | Conductive thin film | |
| Glass plate | | Glass plate | |
| Pressure-sensitive adhesive layer | | — | |
| Light diffusing element | | Light diffusing pressure-sensitive adhesive layer | |
| Polarizing plate | | Polarizing plate | |
| Liquid crystal cell | | Liquid crystal cell | |
| Polarizing plate | | Polarizing plate | |
| Collimated light source device | | Collimated light source device | |

Example 22

Production of Liquid Crystal Display Device

A liquid crystal display device having a construction shown in Table 4 was produced in the same way as in Example 21 except for using the light diffusing element with a reflection preventing layer obtained in Reference Example 1 instead of the light diffusing element of Example 1. Table 7 shows characteristics of the obtained liquid crystal display device.

Comparative Example 9

The light diffusing pressure-sensitive adhesive layer obtained in Reference Example 4 was used instead of the light diffusing element, and the light diffusing pressure-sensitive adhesive layer and a polarizer were attached so as to be brought into close contact with each other to obtain a polarizing plate with a light diffusing pressure-sensitive adhesive layer. A liquid crystal display device having a construction shown in Table 4 was produced in the same way as in Example 21 except for using the polarizing plate with a light diffusing pressure-sensitive adhesive layer. Table 7 shows characteristics of the obtained liquid crystal display device.

Example 23

Production of Liquid Crystal Display Device

A surface of a glass plate (thickness: 200 μm) was washed, and a transparent conductive thin film (hereinafter sometimes referred to as "ITO thin film") (thickness: 150 Å) made of a composite oxide of indium oxide and tin oxide was formed on the surface by a sputtering method to obtain an upper substrate. Five micrometers (5 μm) of an acrylic pressure-sensitive adhesive was applied onto a glass plate (thickness: 200 μm) a surface of which had been washed, and the light diffusing element obtained in Example 1 was attached to the glass substrate. Then, an ITO thin film (thickness: 150 Å) was formed on a surface of the light diffusing element by a sputtering method to obtain a lower substrate. The upper substrate and the lower substrate were placed so that the ITO thin films were opposed to each other via a spacer having a thickness of 50 μm to produce a touch panel.

A liquid crystal display device having a construction shown in Table 5 was produced in the same way as in Example 18 except that the touch panel having a light diffusing element was laminated instead of the front substrate and the polarizing plate with a light diffusing element via 5 μm of an acrylic pressure-sensitive adhesive. Table 7 shows characteristics of the obtained liquid crystal display device.

TABLE 5

| Example 23 | | Comparative Example 10 | |
|---|---|---|---|
| Glass plate | Touch panel | Glass plate | Touch panel |
| Conductive thin film | | Conductive thin film | |
| Spacer | | Spacer | |
| Conductive thin film | | Conductive thin film | |
| Light diffusing element | | Light diffusing pressure-sensitive adhesive layer | |
| Pressure-sensitive adhesive layer | | — | |
| Glass plate | | Glass plate | |
| Pressure-sensitive adhesive layer | | Pressure-sensitive adhesive layer | |
| Polarizing plate | | Polarizing plate | |
| Liquid crystal cell | | Liquid crystal cell | |
| Polarizing plate | | Polarizing plate | |
| Collimated light source device | | Collimated light source device | |

Comparative Example 10

A liquid crystal display device having a construction shown in Table 5 was produced in the same way as in Example 23 except for using the light diffusing pressure-sensitive adhesive layer obtained in Reference Example 4 instead of the light diffusing element and the acrylic pressure-sensitive adhesive of Example 1. Table 7 shows characteristics of the obtained liquid crystal display device.

Example 24

Production of Liquid Crystal Display Device

A liquid crystal display device having a construction shown in Table 6 was produced in the same way as in Example 18 except that a double-sided tape ("No. 532" (trade name), thickness: 60 μm, manufactured by Nitto Denko Corporation) was placed instead of forming the pressure-sensitive adhesive layer. Table 7 shows characteristics of the obtained liquid crystal display device.

TABLE 6

| Example 24 | | | Comparative Example 11 | | |
|---|---|---|---|---|---|
| Acrylic plate | | | Acrylic plate | | |
| Double-sided tape | Air layer | Double-sided tape | Double-sided tape | Air layer | Double-sided tape |
| | — | | | Translucent film | |
| Light diffusing element | | | Light diffusing pressure-sensitive adhesive layer | | |
| Polarizing plate | | | Polarizing plate | | |

TABLE 6-continued

| Example 24 | Comparative Example 11 |
|---|---|
| Liquid crystal cell | Liquid crystal cell |
| Polarizing plate | Polarizing plate |
| Collimated light source device | Collimated light source device |

Comparative Example 11

A liquid crystal display device having a construction shown in Table 6 was produced in the same way as in Comparative Example 7 except that a translucent film ("FUJI-TAC" (trade name), thickness: 40 μm, manufactured by Fuji Photo Film Co., Ltd.) was attached to an exposed light diffusing pressure-sensitive adhesive layer, a double-sided tape ("No. 532" (trade name), thickness: 60 μm, manufactured by Nitto Denko Corporation) was placed on an edge of the translucent film, and an acrylic plate was attached to the resultant. Table 7 shows characteristics of the obtained liquid crystal display device.

TABLE 7

| | Half-value angle of collimated light source device (°) | Front substrate | Thickness on viewer side (μm) | Bright environment (200 lx) | | | Parallax (screen position) |
| | | | | Front white brightness (cd/m$^2$) | Front black brightness (cd/m$^2$) | Front contrast ratio | |
|---|---|---|---|---|---|---|---|
| Example 18 | 2.5 | Acrylic plate | 500 [1] | 300.0 | 0.91 | 330.0 | o |
| Example 19 | | | 500 [1] | 300.0 | 0.87 | 344.0 | o |
| Comparative example 7 | | | 560 [2] | 289.8 | 0.89 | 326.0 | x |
| Example 20 | 15 | Acrylic plate | 500 [1] | 230.3 | 0.81 | 284.0 | o |
| Comparative example 8 | | | 560 [2] | 231.6 | 0.82 | 282.7 | x |
| Example 21 | 2.5 | Touch panel | 960 [3] | 220.0 | 0.73 | 300.0 | o |
| Example 22 | | | 960 [3] | 221.0 | 0.67 | 325.0 | o |
| Comparative example 9 | | | 1,020 [4] | 217.2 | 0.73 | 295.7 | x |
| Example 23 | 2.5 | Touch panel | 550 [3] | 220.0 | 0.74 | 298.0 | o |
| Comparative example 10 | | | 545 [4] | 217.2 | 0.74 | 294.0 | x |
| Example 24 | 2.5 | Acrylic plate | 555 [5] | 273.0 | 0.91 | 300.5 | o |
| Comparative example 11 | | | 660 [6] | 275.0 | 0.92 | 297.8 | x |

[1] Thickness of (acrylic plate + pressure-sensitive adhesive layer + light diffusing element)
[2] Thickness of (acrylic plate + light diffusing pressure-sensitive adhesive layer)
[3] Thickness of (touch panel + pressure-sensitive adhesive layer + light diffusing element)
[4] Thickness of (touch panel + light diffusing pressure-sensitive adhesive layer)
[5] Thickness of (acrylic plate + double-sided tape + light diffusing element)
[6] Thickness of (acrylic plate + double-sided tape + translucent film + light diffusing pressure-sensitive adhesive layer)

<Evaluation>

As is apparent from Table 7, in each of Examples 18 to 24 using a light diffusing element, white brightness was enhanced and black brightness was suppressed in a bright environment, and a front contrast ratio was also enhanced, compared with each of Comparative Examples 7 to 11 using a light diffusing pressure-sensitive adhesive layer. Further, the light diffusing element is thinner than the light diffusing pressure-sensitive adhesive layer, and hence, provides excellent visibility and enables reduction in thickness of a liquid crystal display device. In each of Examples 18 to 24, a thinner light diffusing element was used, and hence, a distance with respect to a liquid crystal cell became smaller compared with Comparative Examples 7 to 11, and parallax was reduced.

The light diffusing element of the present invention is very thin. Therefore, even in Example 24 in which a front substrate was attached through use of a double-sided tape, there was no influence of an air layer, satisfactory visibility was provided in a bright environment, and parallax was reduced. On the other hand, in Comparative Example 11 using a light diffusing pressure-sensitive adhesive layer, a sufficient parallax improvement effect was not obtained.

Example 25

Production of Polarizing Element

To 100 parts of a hard coat resin ("Opster KZ6661" (trade name) (containing MEK/MIBK), manufactured by JSR Corporation) containing 62% of zirconia nanoparticles (average particle diameter: 60 nm, refractive index: 2.19) as an ultrafine particle component were added 70 parts of a 50% MEK solution of pentaerythritol triacrylate ("Biscoat #300" (trade name), refractive index: 1.52, manufactured by Osaka Organic Chemical Industry Ltd.) as a precursor of a resin component, 0.5 part of a photopolymerization initiator ("Irgacure 907" (trade name), manufactured by BASF Japan Ltd.), 0.1 part of a leveling agent ("MEGAFAC 479" (trade name) manufactured by DIC Corporation), and 20 parts of acrylate-based fine particles ("Art Pearl J-4P" (trade name), average particle diameter: 2.1 μm, refractive index: 1.49, manufactured by Negami Chemical Industrial Co., Ltd.) as light diffusing fine particles, and toluene was added as a diluting solvent to the mixture so that its solid content became 50%. This mixture was subjected to treatment with a disper so that the respective components were dispersed uniformly to prepare an application liquid.

The application liquid was applied onto a reflection type polarizer ("DBEF" (trade name), thickness: 38 μm, manufactured by Sumitomo 3M Ltd.) having a birefringent multilayered structure through use of a die coater. The application liquid was dried in an oven at 80° C. for 2 minutes and irradiated with UV light having an integrated light quantity of 300 mJ/cm$^2$ through use of a high-pressure mercury vapor lamp to form a light diffusing element having a thickness of 6.5 μm on the reflection type polarizer. It was confirmed by TEM observation of the light diffusing element that a refractive index modulation region similar to that in Example 1 was formed in the vicinity of an interface between a matrix and a light diffusing fine particle.

Then, a polarizing plate ("NPF" (trade name), thickness: 108 μm, manufactured by Nitta Denko Corporation) including an absorption type polarizer was attached to the reflection type polarizer side via a pressure-sensitive adhesive (thickness: 5 μm) to produce a polarizing element.

The obtained polarizing element was placed on a backlight in a diffusion plate/lamp house construction, and light diffusion illuminance and a lamp image were evaluated.

Example 26

Production of Polarizing Element

A polarizing element was produced in the same way as in Example 25 except for setting the thickness of the light diffusing element to 10.5 μm. The obtained polarizing element was placed on a backlight in a diffusion plate/lamp house construction, and light diffusion illuminance and a lamp image were evaluated.

Example 27

Production of Polarizing Element

A light diffusing element having a thickness of 17.3 μm was formed on a TAC film ("FUJITAC" (trade name) manufactured by Fuji Photo Film Co., Ltd.) in the same way as in Example 25 to produce a film with a light diffusing element. A reflection type polarizer ("DBEF" (trade name), thickness: 38 μm, manufactured by Sumitomo 3M Limited) was attached to the light diffusing element side of the obtained film with a light diffusing element via a pressure-sensitive adhesive (thickness: 5 μm). Then, a polarizing plate ("NPF" (trade name) manufactured by Nitta Denko Corporation) including an absorption type polarizer was attached to the reflection type polarizer side via a pressure-sensitive adhesive (thickness: 5 μm) to produce a polarizing element. The polarizing element thus obtained was placed on a backlight in a diffusion plate/lamp house construction, and light diffusion illuminance and a lamp image were evaluated.

Example 28

Production of Polarizing Element

A polarizing element was produced in the same way as in Example 27 except for setting the thickness of the light diffusing element to 5.0 μm. The obtained polarizing element was placed on a backlight in a diffusion plate/lamp house construction, and light diffusion illuminance and a lamp image were evaluated.

Example 29

Production of Polarizing Element

A polarizing element was produced in the same way as in Example 27 except for setting the thickness of the light diffusing element to 21.5 μm. The obtained polarizing element was placed on a backlight in a diffusion plate/lamp house construction, and light diffusion illuminance and a lamp image were evaluated.

Example 30

Evaluation of Light Diffusion Illuminance and Lamp Image

The polarizing element obtained in Example 26 was placed on a backlight in a transparent plate (acrylic plate)/lamp house construction, and light diffusion illuminance and a lamp image were evaluated.

Example 31

Evaluation of Light Diffusion Illuminance and Lamp Image

The polarizing element obtained in Example 27 was placed on a backlight in a transparent plate (acrylic plate)/lamp house construction, and light diffusion illuminance and a lamp image were evaluated.

Comparative Example 12

A backlight unit was taken out from a commercially available liquid crystal TV ("Bravia KDL-20J1" (trade name) manufactured by Sony Corporation). This backlight unit was configured in such a manner that a reflation type polarizer ("DBEF-D400" (trade name), thickness: 415 μm, manufactured by Sumitomo 3M Limited) having a birefringent multilayered structure having diffusion films laminated in upper and lower portions, and a diffusion sheet were left on a diffusion plate. A polarizing plate ("NPF" (trade name) manufactured by Nitta Denko Corporation) was left on the backlight unit (DBEF-400 side) without being bonded thereto, and in this state, light diffusion illuminance and a lamp image were evaluated.

Table 8 shows characteristics of the light diffusing elements of the respective examples. Further, Table 9 shows evaluation results of light diffusion illuminance and a lamp image together with the total thickness of the obtained polarizing element.

TABLE 8

| | Light diffusion half-value angle (°) | Backscattering ratio (%) | Thickness (μm) |
| --- | --- | --- | --- |
| Example 25 | 40 | 0.27 | 6.5 |
| Example 26 | 66 | 0.60 | 10.5 |
| Example 27 | 104 | 1.60 | 17.3 |
| Example 28 | 28 | 0.20 | 5.0 |
| Example 29 | 140 | 2.85 | 21.5 |
| Example 30 | 66 | 0.60 | 10.5 |
| Example 31 | 104 | 1.60 | 17.3 |
| Comparative example 12 | 30 | 4.70 | — |

TABLE 9

| | Light diffusion illuminance (Lx) | Lamp image | Total thickness (μm) |
| --- | --- | --- | --- |
| Example 25 | 6,440 | ◎ | 157.5 |
| Example 26 | 6,270 | ◎ | 161.5 |
| Example 27 | 6,146 | ◎ | 213.3 |
| Example 28 | 6,484 | ◎ | 201.0 |
| Example 29 | 5,966 | ◎ | 217.5 |
| Example 30 | 7,077 | ○ | 161.5 |
| Example 31 | 6,916 | ○ | 213.3 |

TABLE 9-continued

| | Light diffusion illuminance (Lx) | Lamp image | Total thickness (μm) |
|---|---|---|---|
| Comparative example 12 | 5,586 | ⊚ | 744.0 |

As is apparent from Table 9, a lamp image was eliminated satisfactorily in each of Examples 25 to 31 in the same way as in Comparative Example 12 using a plurality of diffusion films and diffusion sheets. Further, in each of Examples 25 to 31, light diffusion illuminance was higher and light use efficiency was enhanced, compared with Comparative Example 12. The reason for this is considered as follows: the light diffusing element used in each of Examples exhibited excellent light diffusibility, and a backscattering ratio was suppressed satisfactorily as shown in Table 8. In the cases of the light diffusing elements each having a backscattering ratio of 2.0% or less (Examples 25 to 28), light diffusion illuminance was enhanced by 10% or more compared with that of Comparative Example. Further, the light diffusing element used in each of Examples was very thin and was formed directly on an optical member (reflection type polarizer) to eliminate an air layer. It is considered that these properties also contribute to enhancement of light use efficiency. Specifically, in the case where a diffusion film and a diffusion sheet are left as described in Comparative Example 12, an air layer is present. At an interface with the air layer having a large refractive index difference, light is liable to be lost and light use efficiency is degraded. Further, in each of Examples, the thickness (total thickness) was reduced remarkably, compared with Comparative Example 12, to ⅓ or less.

INDUSTRIAL APPLICABILITY

The light diffusing element and the polarizing plate with a light diffusing element of the present invention can each be used suitably in a viewer side member of a liquid crystal display device, a member for a backlight of a liquid crystal display device, and a diffusing member for illumination equipment (for example, an organic EL, LED), particularly suitably as a front diffusing element of a liquid crystal display device of a collimated backlight front diffusing system. The polarizing element of the present invention can be used suitably as a backlight side member of a liquid crystal display device. The liquid crystal display device of the present invention is used for any suitable applications. Examples of the applications include: OA equipment such as a personal computer monitor, a notebook personal computer, and a copying machine; mobile equipment such as a mobile phone, a watch, a digital camera, a personal digital assistance (PDA), and a portable game machine; household electrical equipment such as a video camera, a television, and a microwave oven; in-car equipment such as a back monitor, a monitor for a car navigation system, and a car audio system; display equipment such as a monitor for information for commercial stores, and a digital information display; security equipment such as a surveillance monitor; and nursing and medical equipment such as a monitor for nursing care and a monitor for medical purposes. As one particularly preferred application of the liquid crystal display device of the present invention, there is given a liquid crystal display device of a collimated backlight front diffusion system. As another preferred application of the liquid crystal display device of the present invention, there is given a liquid crystal display device to be used in a mobile phone and a product including a touch panel.

REFERENCE SIGNS LIST 10 matrix
11 resin component
12 ultrafine particle component
20 light diffusing fine particle
30 refractive index modulation region
100, 100' light diffusing element
110 polarizer
120 protective layer
130 protective layer
200 polarizing plate with light diffusing element
300, 300' polarizing element
500, 500', 500'' liquid crystal display device
510 liquid crystal cell
511, 512 substrate
513 liquid crystal layer
530 polarizing plate
550 backlight unit (backlight portion)
560 front substrate

The invention claimed is:

1. A light diffusing element, comprising:
a first region having a first refractive index n1;
a refractive index modulation region having a substantially spherical shell shape and surrounding the first region; and
a second region having a second refractive index n2, the second region being positioned on a side of the refractive index modulation region opposite to the first region,
wherein the light diffusing element satisfies the following expressions (1) and (2):

$$0.0006 \leq \Delta n/L \quad (1)$$

$$10 \leq (\Delta n)^2 \times A \times B \leq 100 \quad (2)$$

where Δn represents an absolute value |n1−n2| of a difference between the first refractive index n1 and the second refractive index n2, L (nm) represents an average thickness of the refractive index modulation region, a unit of Δn/L is (nm$^{-1}$), A represents a number of parts by weight of a material forming the first region with respect to 100 parts by weight of the entire light diffusing element, and B represents a number of parts by weight of a material forming the second region with respect to 100 parts by weight of the entire light diffusing element.

2. A light diffusing element, comprising:
a matrix; and
light diffusing fine particles dispersed in the matrix, wherein:
a refractive index modulation region having a refractive index which changes substantially continuously is formed in an external portion in a vicinity of a surface of each of the light diffusing fine particles; and
the light diffusing element satisfies the following expressions (1) and (2):

$$0.0006 \leq \Delta n/L \quad (1)$$

$$10 \leq (\Delta n)^2 \times A \times B \leq 100 \quad (2)$$

where Δn represents an absolute value |n$_M$−n$_P$| of a difference between an average refractive index n$_M$ of the matrix and a refractive index n$_P$ of each of the light diffusing fine particles, L (nm) represents an average thickness of the refractive index modulation region, a unit of Δn/L is (nm$^{-1}$), A represents a number of parts by weight of the light diffusing fine particles with respect to 100 parts by weight of the entire light diffusing element, and B represents a number of parts by weight of the matrix with respect to 100 parts by weight of the entire light diffusing element.

3. A light diffusing element according to claim 2, wherein the light diffusing element satisfies a relationship of $n_M > n_P$.

4. A light diffusing element according to claim 2, wherein the light diffusing element satisfies the following expression (3):

$$0.005 \leq L/r_P \leq 0.40 \quad (3)$$

where $r_P$ represents a radius (nm) of each of the light diffusing fine particles.

5. A light diffusing element according to claim 2, wherein the matrix comprises a resin component and an ultrafine particle component, and the refractive index modulation region is formed by a substantial gradient of a dispersion concentration of the ultrafine particle component in the matrix.

6. A light diffusing element according to claim 5, wherein the light diffusing element satisfies the following expression (4):

$$|n_P - n_A| < |n_P - n_B| \quad (4)$$

where $n_A$ represents a refractive index of the resin component of the matrix, and $n_B$ represents a refractive index of the ultrafine particle component of the matrix.

7. A light diffusing element according to claim 2, wherein the light diffusing element has a haze of 90% to 99.9%.

8. A light diffusing element according to claim 2, wherein the light diffusing element has a thickness of 4 μm to 50 μm.

9. A light diffusing element according to claim 2, wherein the light diffusing element has a light diffusion half-value angle of 10° to 150°.

10. A polarizing plate with a light diffusing element, comprising: the light diffusing element according to claim 1; and a polarizer.

11. A polarizing plate with a light diffusing element according to claim 10 to be used in a liquid crystal display device including a liquid crystal cell, a front substrate, and a collimated light source device, wherein the polarizing plate with a light diffusing element is placed so that the light diffusing element and the front substrate are opposed to each other when used in the liquid crystal display device.

12. A polarizing element to be placed on a backlight side of a liquid crystal cell of a liquid crystal display device, the polarizing element comprising: the light diffusing element according to claim 1; and a reflection type polarizer.

13. A polarizing element according to claim 12, wherein the light diffusing element is formed directly on the reflection type polarizer.

14. A polarizing element according to claim 12, further comprising an absorption type polarizer.

15. A liquid crystal display device, comprising:
a liquid crystal cell;
a collimated light source device, which is configured to emit collimated light to the liquid crystal cell; and
the light diffusing element according to claim 1, which is configured to transmit and diffuse the collimated light passing through the liquid crystal cell.

16. A liquid crystal display device, comprising:
a liquid crystal cell;
a collimated light source device, which is configured to emit collimated light to the liquid crystal cell;
the light diffusing element according to claim 1, which is configured to transmit and diffuse the collimated light passing through the liquid crystal cell; and
a front substrate placed further on a viewer side of the light diffusing element.

17. A liquid crystal display device according to claim 16, wherein the front substrate is one of a transparent protective plate and a touch panel.

18. A liquid crystal display device, comprising:
a liquid crystal cell;
polarizing plates placed on both sides of the liquid crystal cell;
a touch panel placed so as to be opposed to the polarizing plate on a further viewer side of the polarizing plate placed on a viewer side;
the light diffusing element according to claim 1 placed between a glass plate of the touch panel and a conductive thin film of the touch panel; and
a collimated light source device placed on an outer side of the polarizing plate placed opposite to the viewer side, for emitting collimated light.

19. A liquid crystal display device, comprising:
a liquid crystal cell;
a backlight portion; and
the polarizing element according to claim 12 placed between the liquid crystal cell and the backlight portion.

* * * * *